US009613494B2

(12) United States Patent
Wolf et al.

(10) Patent No.: US 9,613,494 B2
(45) **Date of Patent: *Apr. 4, 2017**

(54) GAMING SYSTEM AND METHOD HAVING PLAYER ACCUMULATED POINTS AND DETERMINING EACH PLAYER'S CHANCES OF WINNING AN AWARD BASED ON THE ACCUMULATED POINTS

(71) Applicant: IGT, Las Vegas, NV (US)

(72) Inventors: Bryan D. Wolf, Reno, NV (US); Ryan W. Cuddy, Reno, NV (US); Eric D. Satterlie, Las Vegas, NV (US)

(73) Assignee: IGT, Las Vegas, NV (US)

( * ) Notice: Subject to any disclaimer, the term of this patent is extended or adjusted under 35 U.S.C. 154(b) by 158 days.

This patent is subject to a terminal disclaimer.

(21) Appl. No.: 14/449,566

(22) Filed: Aug. 1, 2014

(65) Prior Publication Data

US 2014/0342816 A1 Nov. 20, 2014

Related U.S. Application Data

(63) Continuation of application No. 12/243,522, filed on Oct. 1, 2008, now Pat. No. 8,795,058.

(51) Int. Cl.
*A63F 13/00* (2014.01)
*G07F 17/32* (2006.01)
(Continued)

(52) U.S. Cl.
CPC ......... *G07F 17/3258* (2013.01); *G07C 15/00* (2013.01); *G07F 17/32* (2013.01);
(Continued)

(58) Field of Classification Search
CPC ............. G07F 17/3267; G07F 17/3262; G07F 17/3269; G07F 17/3276; G07F 17/3244;
(Continued)

(56) References Cited

U.S. PATENT DOCUMENTS 4,151,404 A 4/1979 Harrington et al.
4,494,197 A 1/1985 Troy et al.
(Continued)

FOREIGN PATENT DOCUMENTS

WO WO 00/32286 6/2000
WO WO 2006/044252 4/2006
(Continued)

OTHER PUBLICATIONS

2008 Nevada Big Game Seasons and Application Regulations, written by Wildlife Administrative Services Office, published prior to Oct. 2008.

(Continued)

*Primary Examiner* — Justin Myhr
(74) *Attorney, Agent, or Firm* — Neal, Gerber & Eisenberg LLP

(57) ABSTRACT

The gaming system and method disclosed herein provides and tracks bonus event eligibility points accumulated by players playing the gaming devices in the gaming system. Upon a triggering of a bonus event, the gaming system generates, for each bonus event eligibility point accumulated for each player, a random number from a predefined range of numbers. The gaming system determines which one of the accumulated bonus event eligibility points is the designated bonus event eligibility point, such as by determining which bonus event eligibility point is associated with the highest valued random number generated. The gaming system then enables the player that accumulated the designated bonus event eligibility point to participate in the bonus event. In the bonus event, one or more awards are provided to the player that accumulated the designated bonus event eligibility point.

22 Claims, 9 Drawing Sheets

| Player | Quantity of Accumulated Bonus Event Eligibility Points | Random Numbers Generated from Predefined Range of Numbers |
|---|---|---|
| A | 3 | 871; 3,215; 7,864 |
| B | 6 | 451; 1,663; 2,596; 2,875; 3,336; 6,698 |
| C | 0 | |
| D | 1 | 7,549 |

(51) Int. Cl.
*G07C 15/00* (2006.01)
*A63F 3/00* (2006.01)

(52) U.S. Cl.
CPC ...... *G07F 17/3244* (2013.01); *G07F 17/3255* (2013.01); *G07F 17/3262* (2013.01); *G07F 17/3267* (2013.01); *A63F 3/00157* (2013.01)

(58) Field of Classification Search
CPC .. G07F 17/3258; G07F 17/34; G07F 17/3213; G07F 17/326; G07F 17/3239; G07F 17/329; G07F 17/3255; G07C 15/00; A63F 3/0605; A63F 3/00157
See application file for complete search history.

(56) References Cited

U.S. PATENT DOCUMENTS

| | | | |
|---|---|---|---|
| 4,527,798 | A | 7/1985 | Siekierski et al. |
| 4,582,324 | A | 4/1986 | Koza et al. |
| 4,652,998 | A | 3/1987 | Koza et al. |
| 5,042,809 | A | 8/1991 | Richardson |
| 5,116,055 | A | 5/1992 | Tracy |
| 5,324,035 | A | 6/1994 | Morris et al. |
| 5,344,144 | A | 9/1994 | Canon |
| 5,560,603 | A | 10/1996 | Seelig et al. |
| 5,564,700 | A | 10/1996 | Celona |
| 5,766,076 | A | 6/1998 | Pease et al. |
| 5,779,545 | A | 7/1998 | Berg et al. |
| 5,807,172 | A | 9/1998 | Piechowiak |
| 5,820,459 | A | 10/1998 | Acres et al. |
| 5,855,515 | A | 1/1999 | Pease et al. |
| 5,885,158 | A | 3/1999 | Torango et al. |
| 5,967,893 | A | 10/1999 | Lawrence et al. |
| 5,997,400 | A | 12/1999 | Seelig et al. |
| 5,997,401 | A | 12/1999 | Crawford |
| 6,089,980 | A | 7/2000 | Gauselmann |
| 6,102,403 | A | 8/2000 | Kaufman |
| 6,117,009 | A | 9/2000 | Yoseloff |
| 6,135,884 | A | 10/2000 | Hedrick et al. |
| 6,152,822 | A | 11/2000 | Herbert |
| 6,159,096 | A | 12/2000 | Yoseloff |
| 6,203,010 | B1 | 3/2001 | Jorasch et al. |
| 6,220,961 | B1 | 4/2001 | Keane et al. |
| 6,224,482 | B1 | 5/2001 | Bennett |
| 6,241,608 | B1 | 6/2001 | Torango |
| 6,272,223 | B1 | 8/2001 | Carlson |
| 6,311,976 | B1 | 11/2001 | Yoseloff |
| 6,331,143 | B1 | 12/2001 | Yoseloff |
| 6,419,583 | B1 | 7/2002 | Crumby et al. |
| 6,435,968 | B1 | 8/2002 | Torango |
| 6,533,664 | B1 | 3/2003 | Crumby |
| 6,569,016 | B1 | 5/2003 | Baerlocher |
| 6,638,167 | B1 | 10/2003 | Sawyer et al. |
| 6,648,756 | B2 | 11/2003 | Moody |
| 6,666,766 | B2 | 12/2003 | Baerlocher et al. |
| 6,688,977 | B1 | 2/2004 | Baerlocher et al. |
| 6,726,563 | B1 | 4/2004 | Baerlocher et al. |
| 6,776,711 | B1 | 8/2004 | Baerlocher |
| 6,793,578 | B2 | 9/2004 | Lucchesi et al. |
| 6,796,902 | B2 | 9/2004 | Baerlocher et al. |
| 6,910,962 | B2 | 6/2005 | Marks et al. |
| 6,955,600 | B2 | 10/2005 | Glavich et al. |
| 6,966,834 | B1 | 11/2005 | Johnson |
| 6,986,055 | B2 | 1/2006 | Carlson |
| 6,991,544 | B2 | 1/2006 | Soltys et al. |
| 7,001,278 | B2 | 2/2006 | Maya et al. |
| 7,056,215 | B1 | 6/2006 | Olive |
| 7,070,501 | B2 | 7/2006 | Cormack et al. |
| 7,160,190 | B2 | 1/2007 | Baerlocher et al. |
| 7,201,657 | B2 | 4/2007 | Baerlocher et al. |
| 7,223,172 | B2 | 5/2007 | Baerlocher et al. |
| 7,300,351 | B2 | 11/2007 | Thomas |
| 7,329,177 | B1 | 2/2008 | Hui |
| 7,341,513 | B2 | 3/2008 | Cuddy et al. |
| 7,371,166 | B1 | 5/2008 | Webb et al. |
| 7,374,171 | B1 | 5/2008 | Mencarelli |
| 7,399,227 | B2 | 7/2008 | Michaelson et al. |
| 7,427,236 | B2 | 9/2008 | Kaminkow et al. |
| 7,455,585 | B2 | 11/2008 | Englman |
| 7,479,062 | B2 | 1/2009 | Michaelson |
| 7,481,709 | B2 | 1/2009 | Bussick et al. |
| 7,914,371 | B2 | 3/2011 | O'Brien |
| 2002/0132658 | A1 | 9/2002 | Brown et al. |
| 2003/0028567 | A1 | 2/2003 | Carlson |
| 2003/0060279 | A1 | 3/2003 | Torango |
| 2003/0158940 | A1 | 8/2003 | Leigh |
| 2003/0186733 | A1 | 10/2003 | Wolf et al. |
| 2003/0222402 | A1 | 12/2003 | Olive |
| 2004/0002376 | A1 | 1/2004 | Swift et al. |
| 2004/0009811 | A1 | 1/2004 | Torango |
| 2004/0072613 | A1 * | 4/2004 | Visocnik ................ G07F 17/32 463/25 |
| 2004/0110555 | A1 | 6/2004 | DeVaull et al. |
| 2004/0116174 | A1 | 6/2004 | Baerlocher et al. |
| 2004/0166942 | A1 | 8/2004 | Muir |
| 2004/0224770 | A1 | 11/2004 | Wolf et al. |
| 2005/0003878 | A1 | 1/2005 | Updike |
| 2005/0119047 | A1 | 6/2005 | Olive |
| 2005/0143168 | A1 | 6/2005 | Torango |
| 2005/0176488 | A1 | 8/2005 | Olive |
| 2005/0209004 | A1 | 9/2005 | Torango |
| 2006/0025195 | A1 | 2/2006 | Pennington et al. |
| 2006/0025210 | A1 | 2/2006 | Johnson |
| 2006/0030387 | A1 | 2/2006 | Jackson |
| 2006/0040732 | A1 | 2/2006 | Baerlocher et al. |
| 2006/0073874 | A1 | 4/2006 | Cregan et al. |
| 2006/0079317 | A1 | 4/2006 | Flemming et al. |
| 2006/0111170 | A1 | 5/2006 | Hornik et al. |
| 2006/0121971 | A1 | 6/2006 | Flomiany et al. |
| 2006/0149561 | A1 | 7/2006 | Govender |
| 2006/0205483 | A1 | 9/2006 | Meyer et al. |
| 2006/0211465 | A1 | 9/2006 | Moshal |
| 2007/0054732 | A1 | 3/2007 | Baerlocher |
| 2007/0054733 | A1 | 3/2007 | Baerlocher |
| 2007/0077990 | A1 | 4/2007 | Cuddy et al. |
| 2007/0085272 | A1 | 4/2007 | Tevolini |
| 2007/0105619 | A1 | 5/2007 | Kniesteadt et al. |
| 2007/0105620 | A1 | 5/2007 | Cuddy et al. |
| 2007/0123341 | A1 | 5/2007 | Tessmer et al. |
| 2007/0155485 | A1 | 7/2007 | Cuddy et al. |
| 2007/0167217 | A1 | 7/2007 | MacVittie et al. |
| 2007/0178953 | A1 | 8/2007 | Torkington et al. |
| 2007/0275777 | A1 | 11/2007 | Walker et al. |
| 2007/0298873 | A1 | 12/2007 | Nguyen et al. |
| 2008/0026808 | A1 | 1/2008 | Yoshizawa |
| 2008/0026824 | A1 | 1/2008 | Muir |
| 2008/0039173 | A1 | 2/2008 | Walther et al. |
| 2008/0045302 | A1 | 2/2008 | Low |
| 2008/0076527 | A1 | 3/2008 | Low et al. |
| 2008/0090651 | A1 | 4/2008 | Baerlocher |
| 2008/0102916 | A1 | 5/2008 | Kovacs |
| 2008/0102920 | A1 | 5/2008 | Baerlocher et al. |
| 2008/0108401 | A1 | 5/2008 | Baerlocher |
| 2008/0108429 | A1 | 5/2008 | Davis et al. |
| 2008/0113706 | A1 | 5/2008 | O'Halloran |
| 2008/0113765 | A1 | 5/2008 | DeWaal |
| 2008/0113768 | A1 | 5/2008 | Baerlocher et al. |
| 2008/0113771 | A1 | 5/2008 | Baerlocher et al. |
| 2008/0139274 | A1 | 6/2008 | Baerlocher et al. |
| 2008/0234021 | A1 | 9/2008 | Palmer et al. |
| 2008/0311981 | A1 | 12/2008 | Schugar |
| 2009/0042641 | A1 | 2/2009 | Anderson et al. |
| 2009/0042644 | A1 | 2/2009 | Zielinski |
| 2009/0104984 | A1 | 4/2009 | Yoshizawa |

FOREIGN PATENT DOCUMENTS

| | | |
|---|---|---|
| WO | WO 2007/030733 | 3/2007 |
| WO | WO 2007/130464 | 11/2007 |
| WO | WO 2008/060513 | 5/2008 |

(56) References Cited

OTHER PUBLICATIONS

Cabela's Trophy Applications and Guide Service Individual State Information . . . Nevada, printed from www.Cabelas.com prior to Oct. 2008.
Cabela's Trophy Applications and Guide Service Individual State Information . . . Colorado, printed from www.Cabelas.com prior to Oct. 2008.
Cabela's Trophy Applications and Guide Service Individual State Information . . . California, printed from www.Cabelas.com prior to Oct. 2008.

* cited by examiner

FIG. 4

| Player | Quantity of Accumulated Bonus Event Eligibility Points | Random Numbers Generated from Predefined Range of Numbers |
|---|---|---|
| A | 3 | 871; 3,215; 7,864 |
| B | 6 | 451; 1,663; 2,596; 2,875; 3,336; 6,698 |
| C | 0 | |
| D | 1 | 7,549 |

FIG. 5

| Player | Quantity of Accumulated Bonus Event Eligibility Points | Random Numbers Generated from Predefined Range of Numbers | Random Numbers Subsequently Generated from Predefined Range of Numbers |
|---|---|---|---|
| A | 3 | 871; 3,215; 7,864 | 5,488 |
| B | 6 | 451; 1,663; 2,596; 2,875; 6,698; 7,864 | 8,997 |
| C | 0 | | |
| D | 1 | 7,549 | |

GAMING SYSTEM AND METHOD HAVING PLAYER ACCUMULATED POINTS AND DETERMINING EACH PLAYER'S CHANCES OF WINNING AN AWARD BASED ON THE ACCUMULATED POINTS

PRIORITY CLAIM

This application is a continuation of, claims priority to and the benefit of U.S. patent application Ser. No. 12/243,522, filed on Oct. 1, 2008, the entire contents of which is incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Symbols or symbol combinations which are less likely to occur usually provide higher awards.

In such known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. This wager may be made by the player a single time or multiple times in a single play of the primary game. For instance, a slot game may have one or more paylines and the slot game may enable the player to make a wager on each payline in a single play of the primary game. Thus, it is known that a gaming machine, such as a slot game, may enable players to make wagers of substantially different amounts on each play of the primary or base game ranging, for example, from 1 credit up to 125 credits (e.g., 5 credits on each of 25 separate paylines). This is also true for other wagering games, such as video draw poker, where players can wager one or more credits on each hand and where multiple hands can be played simultaneously. Accordingly, it should be appreciated that different players play at substantially different wagering amounts or levels and at substantially different rates of play.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. Part of the enjoyment and excitement of playing certain gaming machines is the occurrence or triggering of the secondary or bonus game (even before the player knows how much the bonus award will be).

There is a continuing need to provide new and different gaming machines and gaming systems as well as new and different ways to provide awards to players including bonus awards.

SUMMARY

In various embodiments, the gaming system and method disclosed herein provides and tracks bonus event eligibility points accumulated by players playing the gaming devices in the gaming system. In one embodiment, upon a triggering of a bonus event, the gaming system generates, for each bonus event eligibility point accumulated for each player, a random number from a predefined range of numbers. The gaming system determines which one of the accumulated bonus event eligibility points is the designated bonus event eligibility point based on the generated random numbers, such as by determining which bonus event eligibility point is associated with the highest valued random number generated. The gaming system then enables the player that accumulated the designated bonus event eligibility point to participate in the bonus event. In the bonus event, one or more awards, such as a progressive award, are provided to the player that accumulated the designated bonus event eligibility point. Accordingly, as different players may accumulate different quantities of bonus event eligibility points and a random number is separately generated for each accumulated bonus event eligibility point, the gaming system and method disclosed herein provides that each player's probability of participating in the bonus event (i.e., by accumulating the designated bonus event eligibly point) is proportional to that player's quantity of accumulated bonus event eligibility points.

In one embodiment, the gaming system disclosed herein includes a central server, central controller or remote host in communication with or linked to a plurality of gaming machines or gaming devices. In another embodiment, the gaming system includes a plurality of linked gaming devices, wherein one of the gaming devices functions as the central server, central controller or remote host.

In one embodiment, the gaming devices of the gaming system enable a plurality of players to place a plurality of wagers to play one or more primary games. In this embodiment, upon an occurrence of a bonus event eligibility point accumulation event, the gaming system provides one or more bonus event eligibility points to one or more players at such gaming devices. As described below, each bonus event eligibility point accumulated by a player represents a chance that the player whom accumulated that bonus event eligibility point will participate in a bonus event.

In one such embodiment, a bonus event eligibility point accumulation event occurs and a gaming device provides a player one or more bonus event eligibility points in association with a displayed event in association with the play of the primary game (or a play of any secondary game) at that gaming device. In another embodiment, a bonus event eligibility point accumulation event occurs and one or more gaming devices each provide a player one or more bonus event eligibility points independent of any displayed event in any play of any primary game (and independent of any displayed event in any play of any secondary game).

In one embodiment, zero, one or more bonus event eligibility point accumulation events occur and the gaming system provides zero, one or more bonus event eligibility points until a bonus event triggering condition occurs. In one such embodiment, the bonus event triggering condition occurs based on a displayed event in a play of one or more games (or an accumulation of one or more displayed events in one or more plays of one or more games) of one or more of the gaming devices in the gaming system. In another such embodiment, the bonus event triggering condition occurs independent of any displayed event in any play of any game of any of the gaming devices in the gaming system.

In one embodiment, upon the bonus event triggering condition occurring, the gaming system generates a random number for each accumulated bonus event eligibility point. In this embodiment, each generated random number is selected from the same predefined range of numbers. For example, for each accumulated bonus event eligibility point, the gaming system generates or draws a random number from the range of 0 to 9,999. It should be appreciated that in other embodiments, the ratio of random numbers generated to accumulated bonus event eligibility points may vary (i.e., one bonus event eligibility point may be associated with the generation of a plurality of random numbers or a plurality of bonus event eligibility points may be associated with the generation of one random number).

In one embodiment, after generating a separate random number for each accumulated bonus event eligibility point, the gaming system determines which one of the accumulated bonus event eligibility points is a designated or winning accumulated bonus event eligibility point. In one such embodiment, the gaming system sorts the generated random numbers and determines that the accumulated bonus event eligibility point associated with the highest generated random number is the designated accumulated bonus event eligibility point. In another such embodiment, the gaming system sorts the generated random numbers and determines that the accumulated bonus event eligibility point associated with the lowest generated random number is the designated accumulated bonus event eligibility point, hi another such embodiment, the gaming system sorts the generated random numbers and determines that the accumulated bonus event eligibility point associated with the generated random number that is closest to a supplemental number (such as a randomly generated number) is the designated accumulated bonus event eligibility point. In one example, Player A has accumulated two bonus event eligibility points, Player B has accumulated one bonus event eligibility point, and the gaming system randomly generated the numbers one-hundred-fifty-three (153) and two-thousand-four-hundred-seventeen (2417) for Player A's two accumulated bonus event eligibility points and the number seven-thousand-seven-hundred-thirty-two (7732) for Player B's one accumulated bonus event eligibility point. In this example, the accumulated bonus event eligibility point associated with the highest generated random number is the designated accumulated bonus event eligibility point, and the gaming system determines that Player B's accumulated bonus event eligibility point is the designated accumulated bonus event eligibility point.

In one embodiment, if the gaming system determines that a plurality of accumulated bonus event eligibility points are each designated accumulated bonus event eligibility points (i.e., a tie occurs between the random numbers generated for a plurality of bonus event eligibility points that are each determined to be a designated bonus event eligibility point), the gaming system will regenerate random numbers for the determined designated bonus event eligibility points. In one such embodiment, the gaming system discards the non-designated accumulated bonus event eligibility points and proceeds with determining which one of the remaining accumulated bonus event eligibility points is the designated accumulated bonus event eligibility point. In this embodiment, for each previously determined designated bonus event eligibility point, the gaming system generates a random number from the same range of numbers. The gaming system then determines which one of these accumulated bonus event eligibility points is the designated accumulated bonus event eligibility point as described above. This process continues until the gaming system determines that a single accumulated bonus event eligibility point is the designated accumulated bonus event eligibility point. For example, if the gaming system randomly generated the number two-thousand-four-hundred-seventeen (2417) for one of Player A's two accumulated bonus event eligibility points and the gaming system also randomly generated the number two-thousand-four-hundred-seventeen (2417) for Player B's one accumulated bonus event eligibility point, the gaming system generates another random number for one of Player A's accumulated bonus event eligibility points and for Player B's one accumulated bonus event eligibility point. In this example, if the gaming system randomly regenerated the number three-thousand-six-hundred-thirty-four (3634) for Player A's one previously determined designated bonus event eligibility point and the number six-thousand-four-hundred-fifty-three (6453) for Player B's one previously determined designated bonus event eligibility point and if the bonus event eligibility point associated with the highest regenerated random number is the designated accumulated bonus event eligibility point, the gaming system determines that Player B's accumulated bonus event eligibility point is the designated accumulated bonus event eligibility point.

After determining which accumulated bonus event eligibility point is the one designated accumulated bonus event eligibility point, the gaming system enables the player that accumulated the designated bonus event eligibility point to participate in the bonus event. In the bonus event, one or more bonus event awards, such as one or more progressive awards, are provided to the player that accumulated the designated bonus event eligibility point. Utilizing the examples described above, the gaming system determined that since Player B's one accumulated bonus event eligibility point is the designated accumulated bonus event eligibility point, Player B participates in the bonus event and is provided a bonus event award.

It should be appreciated that in one embodiment of the gaming system disclosed herein, each player's probability of participating in the bonus event is proportional to that player's accumulated quantity of bonus event eligibility points and the total quantity of accumulated bonus event eligibility points. That is, as each bonus event eligibility point is associated with a separate randomly generated number and only one accumulated bonus event eligibility point will be the designated accumulated bonus event eligibility point (i.e., only one accumulated bonus event eligibility point will be associated with a highest or lowest value), this configuration provides that each player's probability of having the designated accumulated bonus event eligibility point is proportional to that player's quantity of accumulated bonus event eligibility points (i.e., that players quantity of random numbers generated). Specifically, if a player has accumulated E bonus event eligibility points and all players have a total of T accumulated bonus event eligibility points, then that player's probability of participating in the bonus event is E/T. For example, if Player A has accumulated five bonus event eligibility points, Player B has accumulated seven bonus event eligibility points and Player C has accumulated eight bonus event eligibility points (for a total of twenty bonus event eligibility points accumulated), then Player A's probability of participating in the bonus event is 25% (or $5/20$), Player B's probability of participating in the bonus event is 35% (or $7/20$) and Player C's probability of participating in the bonus event is 40% (or $8/20$). Accordingly, the gaming system and method disclosed herein provides a gaming system and method which enables a player to accumulate bonus event eligibility points that determine, at least in part, a players probability of participating in a bonus event. Such a gaming system may be employed over various existing bonus game or bonus event systems wherein each player with at least one accumulated bonus event eligibility point has a chance of participating in the bonus event.

Additional features and advantages are described in, and will be apparent from, the following Detailed Description and the figures.

BRIEF DESCRIPTION OF THE FIGURES

FIG. 4 is a chart of an example of each player's quantity of accumulated bonus event eligibility points and the random number generated in association with each of the accumulated bonus event eligibility points.

FIG. 5 is a chart of an example of each player's quantity of accumulated bonus event eligibility points and the random number generated in association with each of the accumulated bonus event eligibility points.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
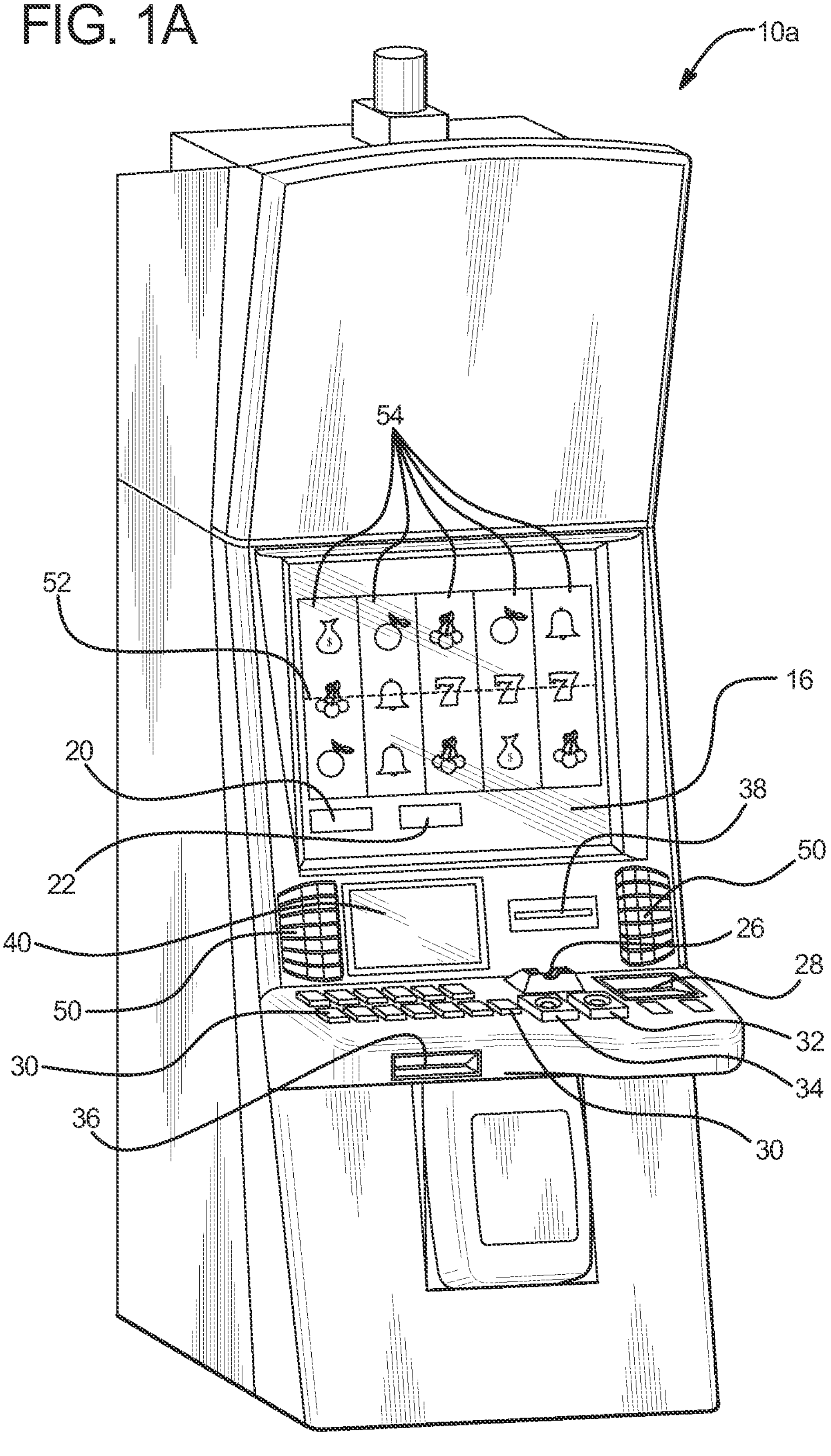
FIGS. 1A and 1B are front perspective views of alternative embodiments of gaming devices disclosed herein.
Figure 1B:
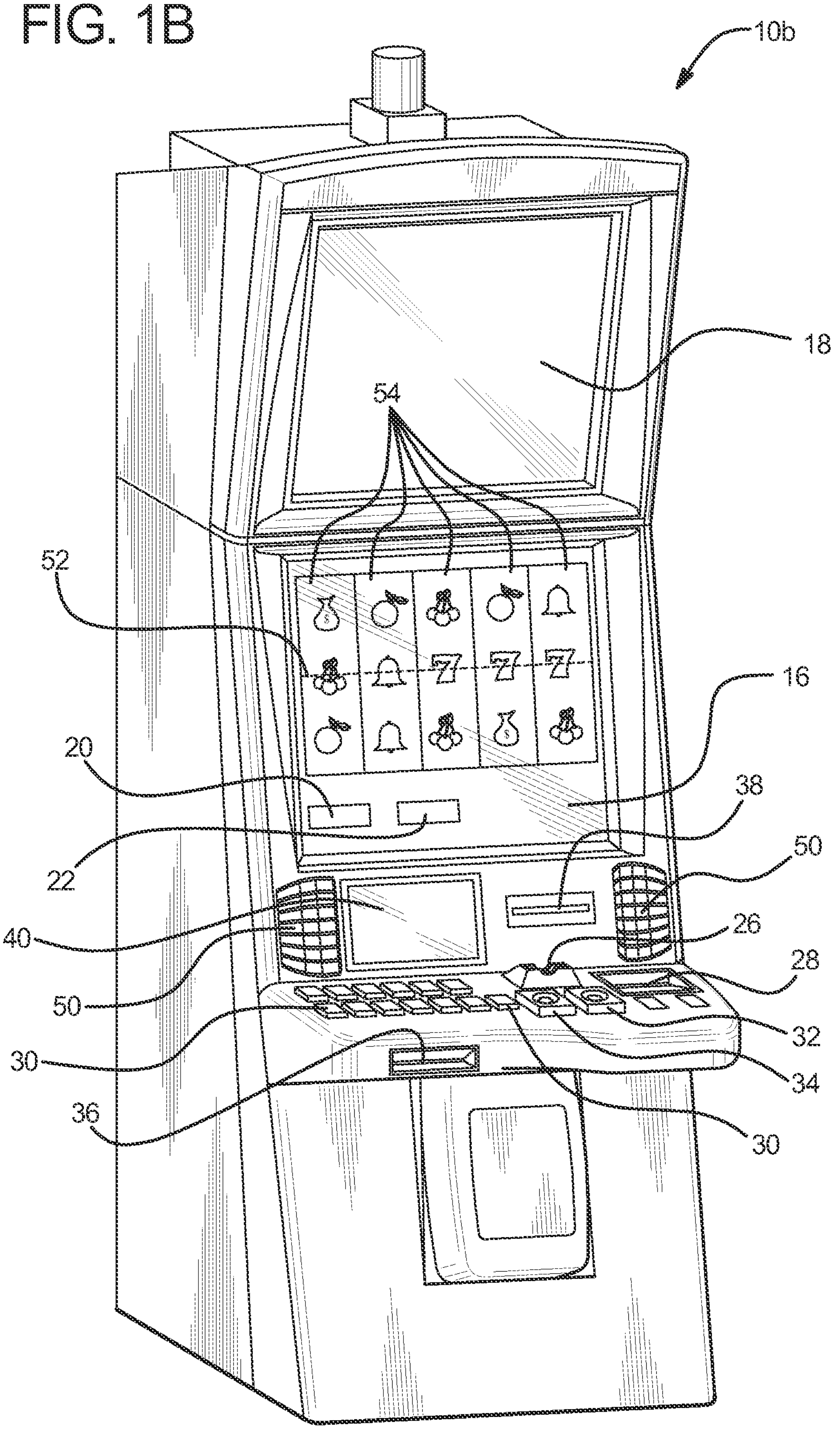

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
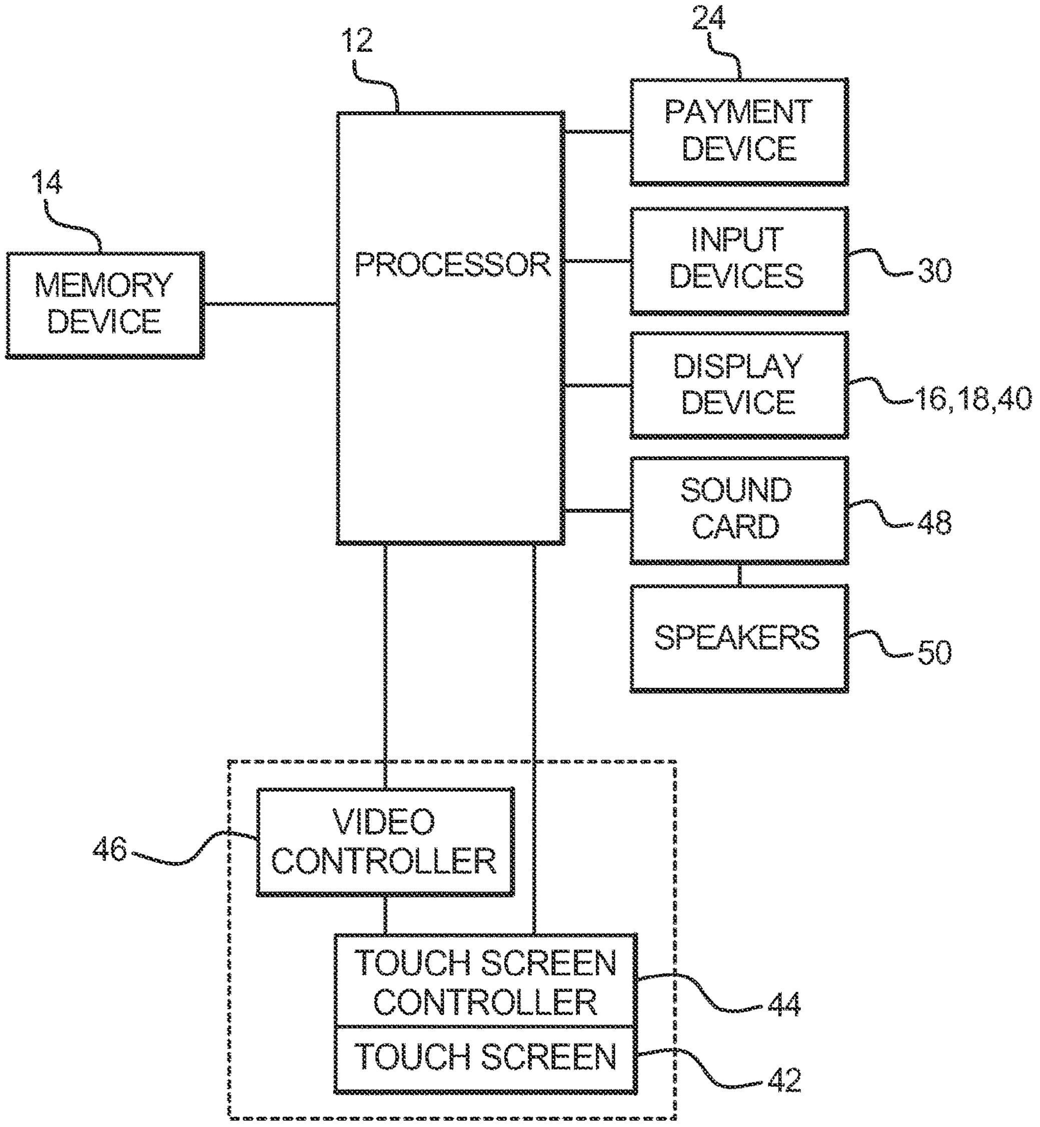
FIG. 2A is a schematic block diagram of the electronic configuration of one embodiment of a gaming device disclosed herein.
Figure 2B:
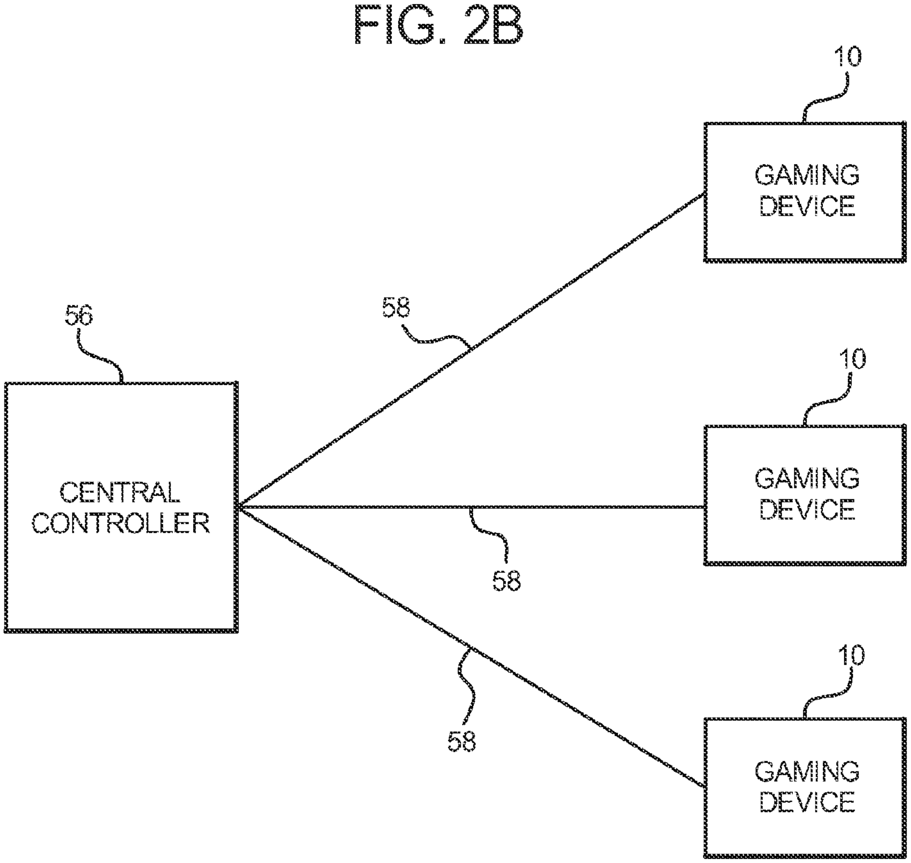
FIG. 2B is a schematic diagram of the central server in communication with a plurality of gaming machines in accordance with one embodiment of the gaming system disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device for central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager for designated primary game wager amount) must have been placed to trigger the secondary game.

In one embodiment, as illustrated in FIG. 23, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or Flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the players first name, the players surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, Internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Bonus Event Eligibility Points

Figure 3:
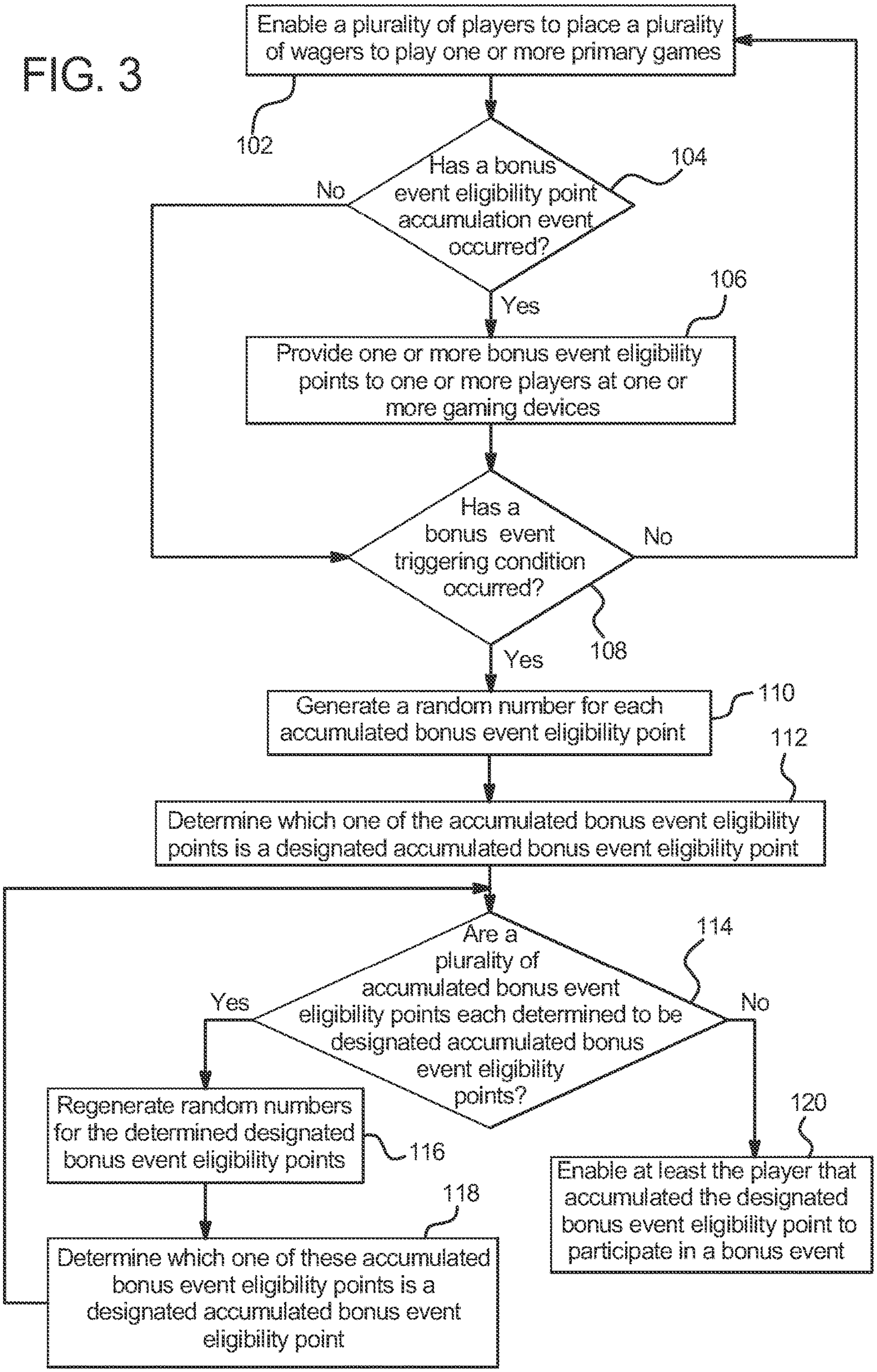
FIG. 3 is a flowchart of one embodiment of the gaming system disclosed herein and illustrating a central server determining, based on a plurality of central server randomly generated numbers for a plurality of bonus event eligibility points, which gaming device to enable to participate in a bonus event.

Referring now to FIG. 3, in one embodiment, the gaming devices of the gaming system enable a plurality of players to place a plurality of wagers to play one or more primary games as described above and as indicated in block 102. In this embodiment, the gaming system determines if a bonus event eligibility point accumulation event has occurred as indicated in diamond 104.

In one embodiment, at least one gaming device and/or the central server determines if a bonus event eligibility point accumulation event occurs in association with the play of the primary game (or a play of any secondary game) at that gaming device. For example, a gaming device and/or central server determines if a symbol-driven event, such as designated symbol or designated symbol combination, is generated in association with the play of the primary game. In another embodiment, at least one gaming device and/or the central server determines if a bonus event eligibility point accumulation event occurs independent of any displayed event in any play of any primary game (and independent of any displayed event in any play of any secondary game). In another embodiment, at least one gaming device and/or the central server tracks the occurrences of one or more suitable events occurring at or in association with one or more players and/or one or more gaming devices in the gaming system and determines, based on these tracked events, whether a bonus event eligibility point accumulation event has occurred. In another embodiment, at least one gaming device and/or the central server defines one or more game play parameters, wherein each time a player's tracked game play activity satisfies the defined parameter, the bonus event eligibility point accumulation event occurs.

If the bonus event eligibility point accumulation event has occurred, in one embodiment, the gaming system provides one or more bonus event eligibility points to one or more players at such gaming devices as indicated in block 106. That is, if a bonus event eligibility point accumulation event occurs, one or more players each accumulate one or more bonus event eligibility points. In one such embodiment, any accumulated bonus event eligibility points are displayed to the players. As described below, each bonus event eligibility point accumulated by a player represents a chance that the player whom accumulated that bonus event eligibility point will participate in a bonus event, hi different embodiments, if a bonus event eligibility point accumulation event occurs, which players accumulate bonus event eligibility points and/or the quantity of bonus event eligibility points accumulated by each player is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

After providing one or more bonus event eligibility points for the occurrence of a bonus event eligibility point accumulation event or after determining that a bonus event eligibility point accumulation event has not occurred (i.e., zero bonus event eligibility points are provided to the players of the gaming devices), the central server and/or one or more of the gaming devices determines if a bonus event triggering condition occurs as indicated in diamond 108.

In one embodiment, at least one gaming device and/or the central server tracks the occurrences of one or more suitable events occurring at or in association with one or more players and/or one or more gaming devices in the gaming system and determines, based on these tracked events, whether a bonus event triggering condition has occurred. In another embodiment, at least one gaming device and/or the central server defines one or more game play parameters, wherein each time a player's tracked game play activity satisfies the defined parameter, the bonus event triggering condition occurs. In another embodiment, at least one gaming device and/or the central server determines if a bonus event triggering condition event occurs in association with the play of the primary game (or a play of any secondary game) at that gaming device. In another embodiment, at least one gaming device and/or the central server determines if a bonus event triggering condition occurs independent of any displayed event in any play of any primary game (and independent of any displayed event in any play of any secondary game).

In one embodiment, if the gaming system determines that a bonus event triggering condition has not occurred, the gaming system does not display and provide any bonus events and enables a plurality of players to place a plurality of wagers to play one or more primary games as described above and as indicated in block 102. On the other hand, if the gaming system determines that a bonus event triggering condition has occurred, the gaming system determines which one of the players will participate in the bonus event, wherein each player's probability of participating in the bonus event is based, at least in part, on that player's quantity of accumulated bonus event eligibility points. In one such embodiment, to determine which player participates in the bonus event, the central server generates a random number for each accumulated bonus event eligibility point as indicated in block 110. In one embodiment, the random number generated for each accumulated bonus event eligibility point is selected from the same predefined range of numbers.

For example, as seen in FIG. 4, the gaming system determined that a bonus event triggering condition occurred and for each accumulated bonus event eligibility point, the central server generated a random number from the range of 0 to 9,999. In this example, Player A currently has three accumulated bonus event eligibility points, Player B currently has six accumulated bonus event eligibility points, Player C currently has zero accumulated bonus event eligibility points, and Player D currently has one accumulated bonus event eligibility point, for a total of ten outstanding accumulated bonus event eligibility points. Accordingly, as illustrated in FIG. 4, the central server randomly generated; three numbers between 0 to 9,999 for Player A (to account for Player A's three accumulated bonus event eligibility points); six numbers between 0 to 9,999 for Player B (to account for Player B's six accumulated bonus event eligibility points); and one number between 0 to 9,999 for Player D (to account for Player D's one accumulated bonus event eligibility point). In this example, as Player C had zero accumulated bonus event eligibility points when the bonus event triggering condition occurred, the central server did not generate any random numbers for Player C. It should be appreciated that in other embodiments, the ratio of random numbers generated to accumulated bonus event eligibility points may vary from a one to one ratio to a one to many ratio. In one such embodiment, the gaming system generates a plurality of random numbers for each accumulated bonus event eligibility point. In another such embodiment, the gaming system generates a random number for a plurality of accumulated bonus event eligibility points.

In one embodiment, after generating a separate random number for each accumulated bonus event eligibility point, the central server determines which one of the accumulated bonus event eligibility points is a designated or winning accumulated bonus event eligibility point as indicated in block 112. In one such embodiment, the central server compares each of the randomly generated numbers generated for or otherwise associated with the bonus event eligibility points to determine which bonus event eligibility point is associated with a designated or winning random number and is thus the designated bonus event eligibility point.

In one such embodiment, the central server sorts the generated random numbers and determines that the accumulated bonus event eligibility point associated with the highest generated random number is the designated accumulated bonus event eligibility point. In another such embodiment, the central server sorts the generated random numbers and determines that the accumulated bonus event eligibility point associated with the lowest generated random number is the designated accumulated bonus event eligibility point. In another such embodiment, the central server sorts the generated random numbers and determines that the accumulated bonus event eligibility point associated with the generated random number that is closest to a supplemental randomly generated number is the designated accumulated bonus event eligibility point. It should be appreciated that this embodiment includes an additional level of randomness because not only is a random number generated for each accumulated bonus event eligibility point, but a random number is further generated for the supplemental number (which the randomly generated numbers associated with the bonus event eligibility points are compared to).

In another such embodiment, the central server sorts the generated random numbers and determines that the accumulated bonus event eligibility point associated with the generated random number that is closest to a mode number is the designated accumulated bonus event eligibility point. In another such embodiment, the central server sorts the generated random numbers and determines that the accumulated bonus event eligibility point associated with the generated random number that is closest to a mean number is the designated accumulated bonus event eligibility point. In another such embodiment, the central server sorts the generated random numbers and determines that the accumulated bonus event eligibility point associated with the generated random number that is closest to a median number is the designated accumulated bonus event eligibility point. Accordingly, in different embodiments, the determination of which accumulated bonus event eligibility point is the designated bonus event eligibility point is based on a comparison of one or more of a player's accumulated bonus event eligibility points to one or more accumulated bonus event eligibility points of at least another player with at least one accumulated bonus event eligibility point. Thus, in these embodiments, the probability of a player (or gaming device) being selected to participate in the bonus event (i.e., one of the player's (or gaming device's) accumulated bonus event eligibility points is the designated bonus event eligibility point) is based, at least in part, on the quantity of bonus event eligibility points accumulated by that player (or gaming device).

In different embodiments, the determination of which accumulated bonus event eligibility point is the designated bonus event eligibility point is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

Utilizing the example described above, if the highest randomly generated number is considered the designated or winning random number, then as seen in FIG. 4, the central server determines that the random number of seven-thousand-eight-hundred-sixty-four (7864) generated in association with one of Player A's three accumulated bonus event eligibility points is the designated or winning random number. Accordingly, in this example, the central server determines that one of Player A's accumulated bonus event eligibility points is the designated or winning bonus event eligibility point. In another example, if the lowest randomly generated number is considered the designated or winning random number, then as seen in FIG. 4, the central server determines that the random number of four-hundred-fifty-one (451) generated in association with one of Player B's six accumulated bonus event eligibility points is the designated or winning random number. Accordingly, in this example, the central server determines that one of Player B's accumulated bonus event eligibility points is the designated or winning bonus event eligibility point.

It should be appreciated that the gaming system disclosed herein provides that each player's probability of accumulating the designated or winning bonus event eligibility points (and thus participating in the bonus event as described below) is proportional to that players accumulated quantity of bonus event eligibility points and the total quantity of accumulated bonus event eligibility points. Specifically, if a player has accumulated E bonus event eligibility points and all players have a total of T accumulated bonus event eligibility points, then the player's probability of participating in the bonus event is E/T. Utilizing the example described above as seen in FIG. 4, Player A has a 30% (or 3/10) chance of participating in the bonus event, Player B has a 60% (or 6/10) chance of participating in the bonus event, Player C has a 0% (or /10) chance of participating in the bonus event and Player D has a 10% (or 1/10) chance of participating in the bonus event.

In an alternative embodiment, the probability of a player being selected to participate in the bonus event is based on that player's quantity of accumulated bonus event eligibility points and one or more additional factors, such as the amount of the player's wager placed, if the player placed a side wager and/or the player's status (determined through a player tracking system). In different embodiments, the probability of a player being selected to participate in the bonus event is based on that players quantity of accumulated bonus event eligibility points and at least one additional determination which is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools, determined based on if the tracked occurrences of one or more suitable events occurring at or in association with one or more players and/or one or more gaming devices in the gaming system have occurred, determined based on if a player's tracked game play activity satisfies a defined parameter or determined based on any other suitable method or criteria.

In one embodiment, determining one of the accumulated bonus event eligibility points as a designated or winning accumulated bonus event eligibility point includes determining if a plurality of accumulated bonus event eligibility points are each determined to be designated accumulated bonus event eligibility points as indicated in diamond 114. That is, if the central server determines that a plurality of the randomly generated numbers are each the designated or winning random number (i.e., a tie occurs between the random numbers generated for such plurality of bonus event eligibility points), the central server determines that a plurality of bonus event eligibility points are each designated bonus event eligibility points.

In one embodiment, if the central server determines that a plurality of accumulated bonus event eligibility points are each determined as designated accumulated bonus event eligibility points, as indicated in block 116, the central server will regenerate random numbers (from the predefined range of numbers) for such determined designated bonus event eligibility points. The central server then determines which one of these accumulated bonus event eligibility points is a designated or winning accumulated bonus event eligibility point as indicated in block 118 and as described above. Following the determination of one of these accumulated bonus event eligibility points is a designated or winning accumulated bonus event eligibility point, the central server again determines if a plurality of accumulated bonus event eligibility points are each still determined to be designated accumulated bonus event eligibility points as indicated in diamond 114. This process continues until the central server determines that a single accumulated bonus event eligibility point is the designated accumulated bonus event eligibility point.

For example, as seen in FIG. 5, if the highest randomly generated number is considered the designated or winning random number, then the central server determines that the random number of seven-thousand-eight-hundred-sixty-four (7864) generated in association with one of Player A's three accumulated bonus event eligibility points and the random number of seven-thousand-eight-hundred-sixty-four (7864) generated in association with one of Player B's six accumulated bonus event eligibility points are both determined to be the designated or winning random number. In this example, since a plurality of accumulated bonus event eligibility points are each determined to be designated accumulated bonus event eligibility points (i.e., a plurality of bonus event eligibility points are each associated with a designated or winning randomly generated number), the central server generates another random number for one of Player A's accumulated bonus event eligibility points and for one of Player B's accumulated bonus event eligibility points and proceeds as described above in determining which of these two accumulated bonus event eligibility points is the designated accumulated bonus event eligibility point. Based on this subsequent random generation, the central server determines that the random number of eight-thousand-nine-hundred-ninety-seven (8997) subsequently generated in association with one of Player B's bonus event eligibility points is the designated or winning random number and thus one of Player B's accumulated bonus event eligibility points is the designated bonus event eligibility point.

In one such embodiment, if the central server determines that a plurality of accumulated bonus event eligibility points are each determined as designated accumulated bonus event eligibility points, the central server discards the non-designated accumulated bonus event eligibility points and determines which one of the remaining accumulated bonus event eligibility points is the designated accumulated bonus event eligibility point. In this embodiment, the central server regenerates random numbers only for the accumulated bonus event eligibility points previously determined to be the designated bonus event eligibility points. In other words, if a bonus event eligibility point was not determined to be a designated bonus event eligibility point (e.g., the bonus event eligibility point did not for the highest number), that bonus event eligibility point cannot be subsequently determined to be the designated bonus event eligibility point because that bonus event eligibility point did not participate in the tie resolution regeneration or redraw. In another embodiment, if the central server determines that a plurality of accumulated bonus event eligibility points are each determined as designated accumulated bonus event eligibility points, the central server regenerates a random number for each accumulated bonus event eligibility point (i.e., the designated bonus event eligibility points and any non-designated accumulated bonus event eligibility points) and determines which one of the bonus event eligibility points is the designated bonus event eligibility point. That is, the central server regenerates random numbers for each of the accumulated bonus event eligibility points and proceeds as described above.

It should be appreciated that the size of the predefined range determines the frequency which a plurality of bonus event eligibility points will each be determined as the designated bonus event eligibility point. That is, the size of the predefined range determines the probability that a tie occurs between the random numbers generated for a plurality of bonus event eligibility points. Thus, if a gaming system operator wants less frequent occurrences of a plurality of bonus event eligibility points each being determined as the designated bonus event eligibility point, the gaming system operator will include larger predefined ranges of numbers for the random numbers to be selected from. In other words, the greater the predefined range, the less frequently, on average, that a tie occurs between the random numbers generated for a plurality of bonus event eligibility points and thus the less frequently, on average, that a plurality of bonus event eligibility points will each be determined as the designated bonus event eligibility point. For example, it is estimated that with a range of 0 to 9,999, a tie of randomly generated numbers will occur, on average, once every 220 games Since the tie resolution described above redraws fewer numbers than the original random number generation (described above), the occurrence of a second, consecutive tie will occur relatively rarely.

In one embodiment, if a single one of the accumulated bonus event eligibility points is initially determined to be a designated or winning accumulated bonus event eligibility point or a plurality of accumulated bonus event eligibility points are each initially determined to be designated accumulated bonus event eligibility points and one or more subsequent random number generations resulted in a single one of the accumulated bonus event eligibility points being determined as a single designated or winning accumulated bonus event eligibility point, the gaming system enables at least the player that accumulated the single designated bonus event eligibility point to participate in a bonus event as indicated in block 120. That is, the gaming device and/or player which accumulated the bonus event eligibility point which was ultimately associated with a designated or winning randomly generated number is provided the bonus event. Accordingly, as each bonus event eligibility point is associated with a separate generated random number and only one accumulated bonus event eligibility point will ultimately be the designated accumulated bonus event eligibility point (e.g., only one accumulated bonus event eligibility point will be associated with a highest or lowest value), this configuration provides that each player's probability of having the designated accumulated bonus event eligibility point is proportional to that player's quantity of accumulated bonus event eligibility points (i.e., that player's quantity of random numbers generated).

In one embodiment, the bonus event includes providing one or more bonus event awards, such as one or more progressive awards, to the player that accumulated the designated bonus event eligibility point. In another embodiment, the bonus event includes providing one or more bonus event awards to one or more players. In another embodiment, the bonus event includes enabling a player to participate in a bonus event game to determine one or more bonus event awards. In another embodiment, the bonus event includes enabling a plurality of players to each participate in a group bonus event game to determine one or more bonus event awards.

It should be appreciated that any suitable manner of providing a bonus event game to one or more players at one or more of the gaming devices may be incorporated in the gaming system disclosed herein. That is, any suitable primary game or secondary game may be utilized as the bonus event game to provide one or more players of one or more gaming devices with one or more bonus event award. In different embodiments, the bonus event game may incorporate any of the types of games described herein, as well as any suitable puzzle-type game, any suitable persistence game, any suitable wheel game, any suitable selection game, any suitable offer and acceptance game, any suitable cascading symbols game, any suitable ways to win game, any suitable scatter pay game, any suitable group game or any other suitable type of game. In different embodiments, the type of bonus event game displayed to one or more of the players at the gaming devices and/or the features incorporated into such bonus event games is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, after determining a designated or winning bonus event eligibility point and enabling one or more players to participate in a bonus event, the gaming system resets each player's accumulated bonus event eligibility points. In another embodiment, after determining a designated or winning bonus event eligibility point and enabling one or more players to participate in a bonus event, the gaming system resets the quantity of accumulated bonus event eligibility points for a plurality of, but less than all of the players. In another embodiment, after determining a designated or winning bonus event eligibility point and enabling one or more players to participate in a bonus event, the gaming system modifies or partially reduces (but does not fully reset), the quantity of accumulated bonus event eligibility points for a plurality the players. In different embodiment, the determination of which players to reset their accumulated bonus event eligibility points and/or the determination of how to modify the quantity of accumulated bonus event eligibility points is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system disclosed herein enables a player to save one or more accumulated bonus event eligibility points. By using an appropriate player tracking system such as a player tracking system implemented with a plurality of player tracking cards, the gaming system enables a player to save one or more accumulated bonus event eligibility points for future use. In one embodiment, the gaming system enables any saved bonus event eligibility points to be saved for a designated period of time (or a designated quantity of games played) and then if unused, any saved accumulated bonus event eligibility points expire. In such embodiments, any saved bonus event eligibility points are saved in association with a player tracking system, in association with the central server and/or in association with the individual gaming devices.

In one embodiment, the gaming devices of the gaming system maintain one or more of the accumulated bonus event eligibility points. In one such embodiment, if a player accumulates one or more bonus event eligibility points in association with their gaming experience at a gaming device, the gaming device maintains such bonus event eligibility points until a bonus event triggering condition occurs. In this embodiment, if a bonus event triggering condition occurs, the central server communicates a request for bonus event eligibility points to the gaming devices in the gaming system and the gaming devices each communicate data or information regarding any accumulated bonus event eligibility points to the central server. In another embodiment, the central server maintains one or more of the accumulated bonus event eligibility points. In another embodiment, the gaming devices of the gaming system maintain one or more of the accumulated bonus event eligibility points and the central server maintains one or more of the accumulated bonus event eligibility points.

Figure 6A:
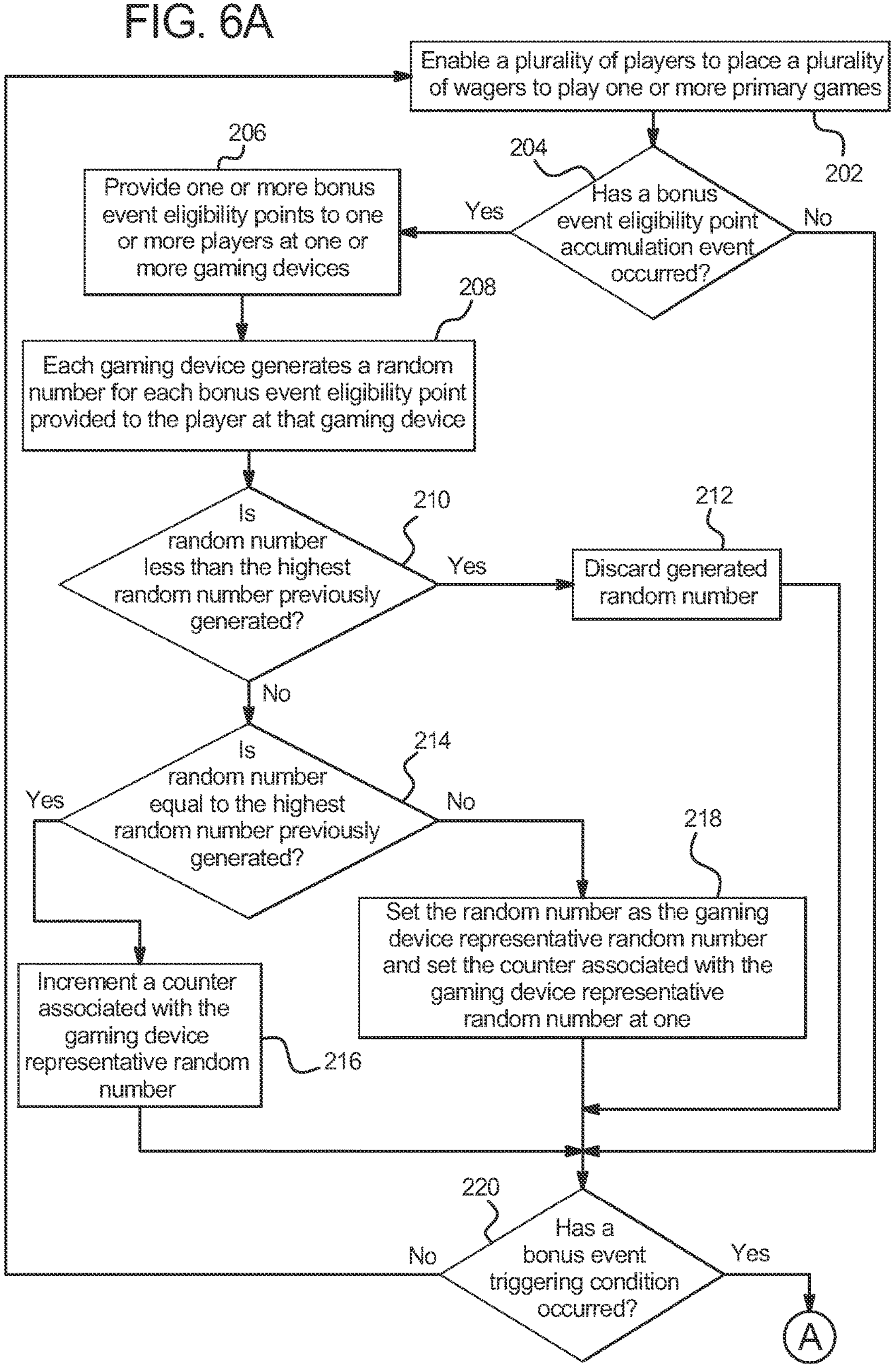
FIGS. 6A, 6B and 6C are flowcharts of different embodiments of the gaming system disclosed herein and illustrating a gaming device determining which randomly generated number to communicate to the central server if a bonus event triggering condition occurs, wherein the central server utilizes such communicated random numbers to determine which gaming device to enable to participate in a bonus event.

In another embodiment, determining which player(s) participate in the bonus event is based, at least in part, on each player's quantity of accumulated bonus event eligibility points, wherein each gaming device generates a random number upon accumulating each bonus event eligibility point. In one such embodiment, as seen in FIG. 6A, the gaming devices of the gaming system enable a plurality of players to place a plurality of wagers to play one or more primary games as described above and as indicated in block 202. In this embodiment, the gaming system determines if a bonus event eligibility point accumulation event has occurred as indicated in diamond 204.

In one embodiment, if the bonus event eligibility point accumulation event has occurred, the gaming system provides one or more bonus event eligibility points to one or more players at such gaming devices as indicated in block 206 of FIG. 6A. In this embodiment, each gaming device generates a random number for each bonus event eligibility point provided to the player at that gaming device as indicated in block 208. In one embodiment, the random number generated for each provided bonus event eligibility point is selected from the same predefined range of numbers. For example, if a bonus event eligibility point accumulation event has occurred, for each bonus event eligibility point provided to a player at a gaming device, that gaming device generates a random number from the range of 0 to 9,999.

After generating a random number for each provided bonus event eligibility point, the gaming device determines, for each generated random number, if that generated random number is a gaming device representative random number. As described below, in one embodiment, each gaming device representative random number may be subsequently communicated to the central server to be utilized in a determination of if the bonus event eligibility point associated with that communicated gaming device representative random number is a designated bonus event eligibility point.

In one such embodiment, determining if the generated random number is a gaming device representative random number includes determining if that random number is less than the highest random number previously generated as indicated in diamond 210. In this embodiment, if the generated random number is less than the highest random number previously generated, the gaming device discards the generated random number as indicated in block 212. For example, for a first gaming device in the gaming system, a bonus event eligibility point accumulation event occurs, the first gaming device is provided one bonus event eligibility point and the first gaming device randomly generates the number one-thousand-five (1005). In this example, if the highest random number previously generated by that gaming device for the current bonus event evaluation period is five-thousand-one (5001), then the first gaming device determines that this randomly generated number is less than the highest random number previously generated and this random number is discarded.

On the other hand, if the generated random number is not less than the highest random number previously generated, the gaming device determines if the generated random number is equal to the highest random number previously generated as indicated in diamond 214. In this embodiment, if the generated random number is equal to the highest random number previously generated, the gaming device increments a counter associated with the gaming device representative random number as indicated in block 216. For example, a first gaming device is provided one bonus event eligibility point, the first gaming device randomly generates the number one-thousand-five (1005) and the highest random number previously generated by that gaming device for the current bonus event evaluation period is one-thousand-five (1005). In this example, upon determining that this randomly generated number of one-thousand-five (1005) is equal to the highest random number previously generated, the first gaming device increments the counter associated with the gaming device representative random number at two (to reflect two occurrence of this gaming device representative random number being generated for the current bonus event evaluation period).

On the other hand, if the generated random number is not equal to the highest random number previously generated (i.e., the generated random number is greater than the highest random number previously generated), the gaming device sets this random number as the gaming device representative random number and sets the counter associated with the gaming device representative random number at one as indicated in block 218 of FIG. 6A. For example, a first gaming device is provided one bonus event eligibility point, the first gaming device randomly generates the number one-thousand-five (1005) and the highest random number previously generated by that gaming device for the current bonus event evaluation period is seven-hundred-twelve (712). In this example, upon determining that this randomly generated number of one-thousand-five (1005) is greater than the highest random number previously generated, the first gaming device sets this randomly generated number as the new or updated gaming device representative random number and sets the counter associated with the gaming device representative random number at one (to reflect one occurrence of this gaming device representative random number being generated for the current bonus event evaluation period).

It should be appreciated that in this embodiment, each gaming device is individually determining a gaming device representative random number for that gaming device and thus the plurality of gaming devices of the gaming system will collectively include a plurality of gaming device representative random numbers of differing (and possibly overlapping) values. It should further be appreciated that this illustrated embodiment includes the highest random number previously generated as the gaming device representative random number, however any suitable qualification for the representative random number may be utilized in accordance with the gaming system disclosed herein.

After providing one or more bonus event eligibility points for the occurrence of a bonus event eligibility point accumulation event or after determining that a bonus event eligibility point accumulation event has not occurred (i.e., zero bonus event eligibility points are provided to the players of the gaming devices), the central server and/or one or more of the gaming devices determines if a bonus event triggering condition occurs as indicated in diamond 220 and described above. In one embodiment, if the gaming system determines that a bonus event triggering condition has not occurred, the gaming system does not provide any bonus events and enables a plurality of players to place a plurality of wagers to play one or more primary games as indicated in block 202.

Figure 6B:
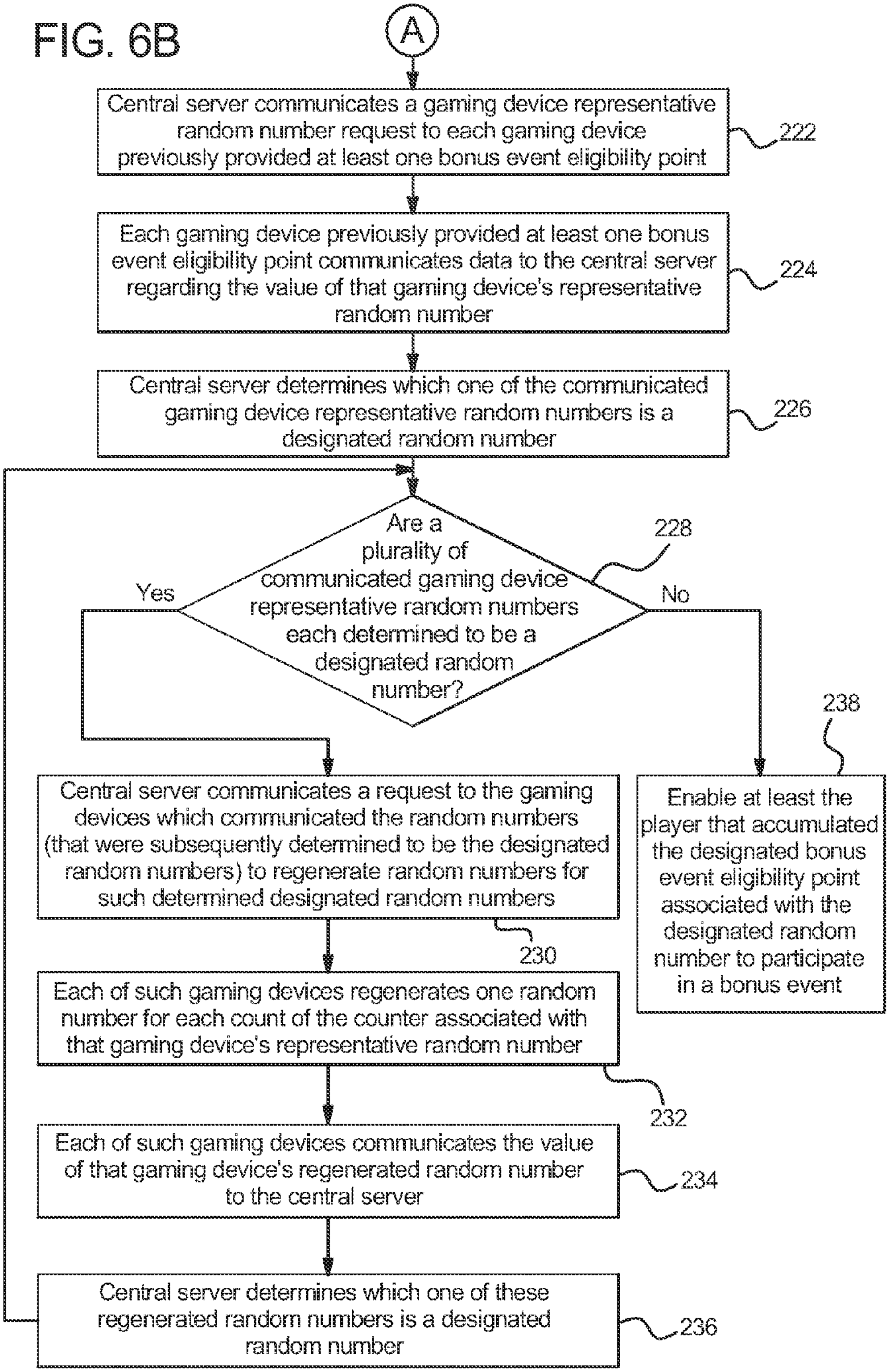
Figure 6C:
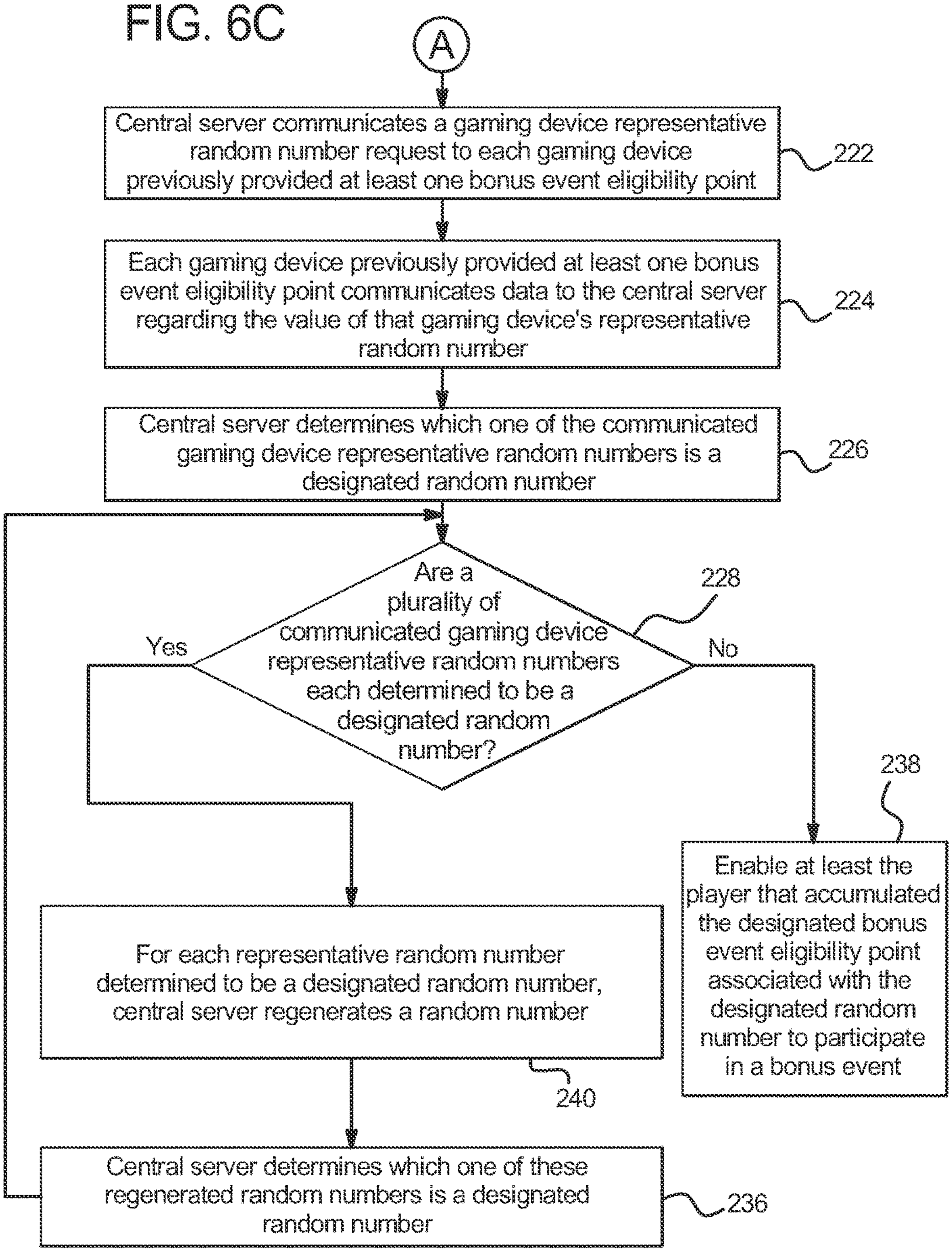

On the other hand, if the gaming system determines that a bonus event triggering condition has occurred, the central server communicates a gaming device representative random number request to each gaming device previously provided at least one bonus event eligibility point as indicated in block 222 of FIGS. 6B and 6C. In one such embodiment, the central server also requests data or information regarding the current count of each gaming device's representative random number counter for purposes of scaling award values.

In one embodiment, in response to receiving the gaming device representative random number request, each gaming device previously provided at least one bonus event eligibility point communicates data or information to the central server regarding the value of that gaming device's designated random number as indicated in block 224. Utilizing the example described above, if the first gaming device determines that the randomly generated number of one-thousand-five (1005) is the gaming device representative random number, the first gaming device communicates data or information to the central server regarding this gaming device representative random number of one-thousand-five (1005).

After receiving information from each gaming device previously provided at least one bonus event eligibility point regarding the value of that gaming device's representative random number, the central server determines which one of the communicated gaming device representative random numbers is a designated random number as indicated in block 226. In one such embodiment, the central server compares each of the communicated gaming device representative random numbers generated for the bonus event eligibility points to determine which gaming device representative random number is a designated or winning random number.

In one such embodiment, the central server sorts the communicated gaming device representative random numbers and determines that the highest communicated gaming device representative random number is the designated random number (and thus the bonus event eligibility point associated with this communicated gaming device representative random numbers is the designated accumulated bonus event eligibility point). In another such embodiment, the central server sorts the communicated gaming device representative random numbers and determines that the lowest communicated gaming device representative random number is the designated random number (and thus the bonus event eligibility point associated with this communicated gaming device representative random numbers is the designated accumulated bonus event eligibility point). In another such embodiment, the central server sorts the communicated gaming device representative random numbers and determines that the communicated gaming device representative random number that is closest to a supplemental randomly generated number is the designated random number (and thus the bonus event eligibility point associated with this communicated gaming device representative random numbers is the designated accumulated bonus event eligibility point). In different embodiments, the determination of which communicated gaming device representative random number is the designated random number (and thus associated with the designated bonus event eligibility point) is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, determining a designated or winning random number includes determining if a plurality of the communicated gaming device representative random numbers are each determined to be a designated random number as indicated in diamond 228. That is, if the central server determines that a plurality of the gaming device representative random numbers are each the designated number (i.e., a tie occurs between the communicated gaming device representative random numbers), the central server determines that a plurality of gaming device representative random numbers are each a designated random number.

In one embodiment, if the central server determines that a plurality of gaming device representative random numbers are each determined as a designated random number, as indicated in block 230 of FIG. 6B, the central server communicates a request to the gaming devices which communicated such gaming device representative random numbers (that were subsequently determined to be designated random numbers) to regenerate or redraw another random number (from the predefined range of numbers) for such determined designated random numbers. In this embodiment, each of such gaming devices regenerates one random number for each count of the counter associated with the gaming device representative random number as indicated in block 232 of FIG. 6B. After generating another random number (from the predefined range) for each count of the counter associated with that gaming device's representative random number, each of such gaming devices communicates data or information to the central server regarding the value of that gaming device's regenerated random number as indicated in block 234 of FIG. 6B. For example, if the highest communicated gaming device representative random number is considered the designated or winning random number, the central server determines that the communicated gaming device representative random number of one-thousand-five (1005) communicated from the first gaming device is one of a plurality of designated random numbers, and the first gaming device's counter associated with such a representative random number is currently set at three, then the first gaming device regenerates three random numbers (from the same predefined range of numbers). These three subsequently generated random numbers are then communicated to the central server as described above. In this example, each of these three randomly generated numbers represents a chance of being the designated random number associated with the designated bonus event eligibility point.

In one such embodiment, when communicating data or information regarding each gaming device's representative random number, each gaming device also communicates data or information regarding the current count of each gaming device's representative random number counter. In this embodiment, when the central server regenerates random numbers for such determined designated random numbers, the central server generates a random number (from the predefined range) for each communicated count for such determined designated random numbers.

In another embodiment, if the central server determines that a plurality of gaming device representative random numbers are each determined as a designated or winning random number, the central server will regenerate random numbers (from the predefined range of numbers) for such determined gaming device representative random numbers as seen in block 240 of FIG. 6C. That is, in this embodiment, any ties amongst the gaming device representative random numbers are resolved by the central server.

In these embodiments, after the gaming devices and/or the central server regenerate one or more random numbers, the central server determines, as described above, which one of these regenerated random numbers is the designated or winning random number as indicated in block 236 of FIGS. 6B and 60. In this embodiment, the central server again determines if a plurality of the regenerated random numbers are each determined to be the designated random numbers as indicated in diamond 228 and as described above. This process continues until the central server determines that a single random number is the designated random number.

In one embodiment, if a single one of the gaming device representative random numbers is initially determined to be a designated random number or a plurality of gaming device representative random numbers are each initially determined to be designated random numbers and one or more subsequent random number generations resulted in a single one of the gaming device regenerated random numbers being determined as a single designated random number, as indicated in block 238, the gaming system enables at least the player that accumulated the designated bonus event eligibility point associated with the designated random number to participate in a bonus event. That is, the gaming device and/or player which accumulated the bonus event eligibility point which was ultimately associated with the designated or winning randomly generated number is provided the bonus event.

In another embodiment, the gaming system enables a player to place a bonus event wager for a play of a game, wherein the bonus event wager is in addition to any wagers placed on the primary game (i.e., any non-bonus event wagers). In this embodiment, if the player places the bonus event wager and a designated symbol or designated symbol combination is generated for the play of the game (i.e., a bonus event eligibility point accumulation event has occurred), the gaming system provides the player one or more bonus event eligibility points. In another embodiment, the gaming system enables a player to place a bonus event wager for a play of a game, wherein if the player places the bonus event wager and a bonus event eligibility point accumulation event occurs, one or more bonus event eligibility points are provided to the player of that gaming device independent of any displayed event in the play of the primary game (and independent of any displayed event in a play of any secondary game). In one such embodiment including a bonus event wager, the quantity of bonus event eligibility points provided to (i.e., accumulated by) the player is based on the non-bonus event wager placed on the game.

In one embodiment, a bonus event eligibility point accumulation event occurs (e.g., an event which causes the accumulation of one or more bonus event eligibility points) based on one or more game play events, such as a symbol-driven trigger. In other embodiments, the bonus event eligibility point accumulation event occurs based on exceeding a certain amount of game play (such as number of games, number of credits, or elapsed amount of time), or based on reaching a specified number of points earned during game play.

In another embodiment, the bonus event eligibility point accumulation event occurs based on a random trigger or on an apparently random trigger. In one such embodiment, the gaming system does not provide any apparent reasons to the player for the occurrence of the bonus event eligibility point accumulation event, wherein the bonus event eligibility point accumulation event is not based on any event in any of the plays of any primary games or on any of the plays of any secondary game of the gaming system. That is, the bonus event eligibility point accumulation event occurs without any explanation or alternatively with simple explanations. In another embodiment, the bonus event eligibility point accumulation event occurs at least partially based on a game event, such as a symbol-driven trigger, and at least partially based on a non-game play event, such as a random event.

In one such embodiment, the occurrence of the bonus event eligibility point accumulation event is randomly determined, wherein different players are assigned different chances of obtaining a bonus event eligibility point accumulation event based on theft respective wager levels. For example, if a first player wagered 500 coins and a second player wagered 225 coins and the chance of obtaining the bonus event eligibility point accumulation event was 1/20,000, the first player would have a 2.5% (500/20,000) chance of obtaining the bonus event eligibility point accumulation event for the first player while the second player would have a 1.125% (225/20,000) chance of obtaining the bonus event eligibility point accumulation event for the second player.

In one such embodiment, the bonus event eligibility point accumulation event occurs based on at least one accumulated value progressive award incremented to a progressive award hit value. In this embodiment, the gaming system includes one or more accumulated value progressive awards or Nth coin progressive awards. Such accumulated value progressive awards are driven by an amount of wagers placed or a suitable coin-in amount. In one such embodiment, each accumulated value progressive award is associated with a range of values, wherein a bonus event eligibility point accumulation event will occur when the progressive award increments to a progressive award hit value within the range of values associated with that progressive award. That is, when an accumulated value progressive award increases to a determined progressive award hit value, a bonus event eligibility point accumulation event will occur. In different embodiments, the progressive award hit value at which an accumulated value progressive award causes a bonus event eligibility point accumulation event to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a bonus event eligibility point accumulation event to occur, the accumulated value progressive award is reset to a default value and starts incrementing from the default progressive award level.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award is based on a player's status (via a player tracking system).

In another such embodiment, the bonus event eligibility point accumulation event occurs based on time. In this embodiment, a time is set for when a bonus event eligibility point accumulation event will occur. In one embodiment, such a set time is based on historic data. In one such embodiment, if previous bonus event eligibility point accumulation events have occurred after approximately thirty-seven minutes, a bonus event eligibility point accumulation event is set to trigger thirty-seven minutes from the conclusion of the previous bonus event eligibility point accumulation event. In one embodiment, a suitable algorithm is implemented to determine the player who wagered at or closest to this time with tie-breaking based on any number of factors (e.g., player tracking history, amount of or recent wagers placed).

In another such embodiment, the bonus event eligibility point accumulation event occurs based on a predefined variable reaching a defined parameter threshold. For example, the bonus event eligibility point accumulation event occurs when the 500th different player has played the gaming system associated with the bonus event eligibility point accumulation event (ascertained from a player tracking system). In different embodiments, the predefined parameter thresholds include a length of time, a length of time after a certain dollar amount is hit, a wager level threshold for the gaming system (which gaming device is the first to contribute $250,000), a number of gaming machines in the gaming system active, or any other parameter that would define a threshold for the occurrence of the bonus event eligibility point accumulation event.

In another such embodiment, the bonus event eligibility point accumulation event occurs after a random number of plays in which a bonus event eligibility point accumulation event has not occurred. In another alternative embodiment, the gaming system determines if a bonus event eligibility point accumulation event occurs based upon gaming system operator defined player eligibility parameters stored on a player tracking system (such as via a player tracking card or other suitable manner). For example, a gaming system operator may choose to only enable players of the highest player tracking status to be eligible for a bonus event eligibility point accumulation event. In this embodiment, the parameters for eligibility are defined by the gaming system operator based on any suitable criterion. In one embodiment, the central controller/gaming device processor recognizes the player's identification (via the player tracking system) when the player inserts their player tracking card in the gaming machine. The central server/gaming device processor determines the player tracking level of the player and if the current player tracking level defined by the gaming system operator is eligible for the bonus event eligibility point accumulation event. In one embodiment, the gaming system operator defines minimum bet levels required for the bonus event eligibility point accumulation event based on the player's card level. In this embodiment, different bet amounts are required to be eligible for different bonus event eligibility point accumulation events. In another embodiment, as described above, different side bets or side-wager amounts are required to be eligible for different bonus event eligibility point accumulation events. Once the central controller/gaming device processor determines which players are eligible, any suitable method for determining if a bonus event eligibility point accumulation event occurs may be employed.

In another such embodiment, the occurrence of the bonus event eligibility point accumulation event includes a system determination which is based on a random selection by the central controller. In one embodiment, the central controller tracks all active gaming systems and the wagers they placed. Each gaming system has its own entry defining its state as either active or inactive and also defining the values of the wagers from that gaming system. In one embodiment, active status means that the gaming system is being actively played by a player and enrolled/inactive status means that the gaming system is not being actively played by a player. The active status requirements can be based on any suitable number of satisfied criteria or defined in any suitable manner by the implementer of the gaming system. In one embodiment, a play of or wager on the primary game of the gaming system within a predetermined period of time is part of the determination of whether that gaming system is in the active status. Other factors such as: (a) the amount of time between each play of or wager on the primary game of the gaming system; (b) the amount being wagered on the primary game(s); and (c) the number of plays within a period of time, may also or alternatively be part of the determination of whether a gaming system is in the active status; (d) the existence of credits on the gaming system may also or alternatively be part of the determination of whether a gaming system is in the active status.

In one such embodiment, based on the gaming machine's state as well as one or more wager pools associated with the gaming machine, the central controller determines if a bonus event eligibility point accumulation event occurs for one or more gaming devices. In one embodiment, a bonus event eligibility point accumulation event occurs for the gaming machine which has been classified as active the longest since the last triggering event. In another embodiment, a bonus event eligibility point accumulation event occurs based on the relative proportion of gaming/wagering activity at each gaming device in the gaming system. In this embodiment, a bonus event eligibility point accumulation event is more likely to occur for the player who consistently places a higher wager than a player who consistently places a minimum wager.

In another embodiment, the central controller determines, in cooperation with the gaming system, when to cause a bonus event eligibility point accumulation event to occur by utilizing one or more random number generators. In this embodiment, the central controller determines when to cause the bonus event eligibility point accumulation event to occur by determining if any numbers allotted to a gaming system match a randomly selected number. In one such embodiment, upon or prior to each play of the game, a random number is selected from a range of numbers and during each primary game, the gaming system allocates the first N numbers in the range, where N is the number of credits bet by the player in that primary game. At the end of the primary game, the randomly selected number is compared with the numbers allocated to the player and if a match occurs, the gaming system causes a bonus event eligibility point accumulation event to occur. It should be appreciated that any suitable manner of causing the bonus event eligibility point accumulation event to occur may be implemented with the gaming system disclosed herein.

In one embodiment, the central controller and an individual gaming machine work in conjunction with each other to determine when a bonus event eligibility point accumulation event occurs, for example through an individual gaming machine meeting a predetermined requirement or criteria established by the central controller. In another embodiment, an individual gaming machine may determine when one or more bonus event eligibility point accumulation events occur. In another embodiment, an individual gaming machine may determine when at least one bonus event eligibility point accumulation event occurs and the central controller determines when at least one bonus event eligibility point accumulation event occurs. In different embodiment, the determination of if a bonus event eligibility point accumulation event occurs is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria. It should be appreciated that any suitable determination of how and when one or more bonus event eligibility point accumulation events occur may be implemented in accordance with the gaming system disclosed herein.

In another embodiment, if a bonus event triggering condition occurs, the random number generated for a plurality of accumulated bonus event eligibility points are each selected from a different predefined range of numbers. In one such embodiment, the gaming system selects random numbers from different ranges of numbers for different players of different player tracking rankings. For example, for each bonus event eligibility point accumulated by a player associated with a gold player tracking ranking (i.e., Player A), the gaming system selects a random a random number from the range of 0 to 10,000. In this example, for each accumulated bonus event eligibility point accumulated by a player associated with a platinum player tracking ranking (i.e., Player B), the gaming system selects a random a random number from the range of 0 to 9,000. This example configuration provides that 10% of the time, Player A's accumulated bonus event eligibility point will automatically be selected the designated bonus event eligibility point. Of the remaining 90% of time, half the wins will, on average, go to Player A and half to Player B. Accordingly, this configuration provides that Player A participates in the bonus event 55% of the time and Player B participates in the bonus event 45% of the time.

In the general case, if A_Range>B_Range, $$A\_\text{WinFrequency}=(A\_\text{Range}-B\_\text{Range})/A\_\text{Range}+0.5*B\_\text{Range}/A\_\text{Range}.$$

Thus, if an operator wants A to win X % of the time, the operator sets A's range to: A_Range=B_Range/(2*(1−A_WinFrequency)).

In another embodiment, the gaming system selects random numbers from different ranges of numbers for different players wagering at different levels. This embodiment is used to scale players probabilities of participating in the bonus event to their wager. For example, each time a bonus event eligibility point accumulation event occurs, the player earns or accumulates one bonus event eligibility point, but the random number drawn for this earned bonus event eligibility point is in the range of 1 to 10,000*the player's wager. Such a configuration provides that each player's probability of participating in the bonus event are scaled to that player's wager.

In different embodiments, which predefined range of numbers utilized to select random numbers is predetermined, randomly determined, determined based on a generated symbol or symbol combination, determined based on a random determination by the central controller, determined based on a random determination at the gaming machine, determined based on one or more side wagers placed, determined based on the player's primary game wager, determined based on an amount of wagers a player placed to accumulate a quantity of bonus event eligibility points, determined based on the total wagers placed by players in a group, determined based on time (such as the time of day), determined based on an amount of coin-in accumulated in one or more pools or determined based on any other suitable method or criteria.

In another embodiment, if a bonus event eligibility point accumulation event occurs, a plurality of players each accumulate a different quantity of bonus event eligibility points. In another embodiment, if a bonus event eligibility point accumulation event occurs, each of the players at the gaming devices in the gaming system accumulate a different quantity of bonus event eligibility points. In another embodiment, if a bonus event eligibility point accumulation event occurs, a plurality of players each accumulate the same quantity of bonus event eligibility points. In another embodiment, if a bonus event eligibility point accumulation event occurs, each of the players at the gaming devices in the gaming system accumulate the same quantity of bonus event eligibility points.

In another embodiment, the gaming system multipliers the quantity of bonus event eligibility points generated (for the occurrence of a bonus event eligibility point accumulation event) by the wager placed in association with the occurrence of the bonus event eligibility point accumulation event. For example, a player wagering ten credits would accumulate twice as many bonus event eligibility points (upon the occurrence of the bonus event eligibility point accumulation event) than a player wagering five credits. In another embodiment, the gaming system multipliers the quantity of bonus event eligibility points generated (for the occurrence of a bonus event eligibility point accumulation event) by the denomination of the gaming device played when the bonus event eligibility point accumulation event occurred. For example, a player wagering ten credits on a ten-cent denomination gaming device would accumulate twice as many bonus event eligibility points (upon the occurrence of the bonus event eligibility point accumulation event) than a player wagering ten credits on a five-cent denomination gaming device. In different embodiments, the quantity of bonus event eligibility points accumulated for a player/gaming device upon the occurrence of a bonus event eligibility point accumulation event is, at least in part, predetermined, randomly determined, determined based on a generated symbol or symbol combination, determined based on a random determination by the central controller, determined based on a random determination by one or more gaming devices, determined based on the occurrence of a bonus event eligibility point accumulation event, determined based on the occurrence of a bonus event eligibility point accumulation event and the wager placed, determined based on the gaming device played, determined based on the status of one or more players (such as determined through a player tracking system), determined based on one or more side wagers placed, determined based on time (such as the time of day), determined based on the amount of coin-in accumulated in one or more pools, or determined based on any other suitable method or criteria.

In one embodiment, a bonus event triggering condition occurs (e.g., to trigger a bonus event) based on one or more game play events, such as a symbol-driven trigger. In other embodiments, the bonus event triggering condition occurs based on exceeding a certain amount of game play (such as number of games, number of credits, or elapsed amount of time), or based on reaching a specified number of points earned during game play.

In another such embodiment, the bonus event triggering condition occurs based on a random trigger or on an apparently random trigger. In one such embodiment, the gaming system does not provide any apparent reasons to the player for the occurrence of the bonus event triggering condition, wherein the bonus event triggering condition is not based on any event in any of the plays of any primary games or on any of the plays of any secondary game of the gaming system. That is, the bonus event triggering condition occurs without any explanation or alternatively with simple explanations. In another embodiment, the bonus event triggering condition occurs at least partially based on a game event, such as a symbol-driven trigger, and at least partially based on a non-game play event, such as a random event.

In one such embodiment, the occurrence of the bonus event triggering condition is randomly determined, wherein different players are assigned different chances of obtaining a bonus event triggering condition based on their respective wager levels. For example, if a first player wagered 500 coins and a second player wagered 225 coins and the chance of obtaining the bonus event triggering condition was $1/20,000$ (per coin wagered), the first player would have a 2.5% ($500/20,000$) chance of obtaining the bonus event triggering condition for the first player while the second player would have a 1.125% ($225/20,000$) chance of obtaining the bonus event triggering condition for the second player. In another embodiment, the occurrence of the bonus event triggering condition is randomly determined, wherein different games played (or gaming devices played) are assigned different chances of obtaining a bonus event triggering condition. In another embodiment, the occurrence of the bonus event triggering condition is randomly determined, wherein different denomination gaming devices are assigned different chances of obtaining a bonus event triggering condition.

In one such embodiment, the bonus event triggering condition occurs based on at least one accumulated value progressive award incremented to a progressive award hit value. In this embodiment, the gaming system includes one or more accumulated value progressive awards or Nth coin progressive awards. Such accumulated value progressive awards are driven by an amount of wagers placed or a suitable coin-in amount. In one such embodiment, each accumulated value progressive award is associated with a range of values, wherein a bonus event triggering condition will occur when the progressive award increments to a progressive award hit value within the range of values associated with that progressive award. That is, when an accumulated value progressive award increases to a determined progressive award hit value, a bonus event triggering condition will occur. In different embodiments, the progressive award hit value at which an accumulated value progressive award causes a bonus event triggering condition to occur is predetermined, randomly determined, determined based on the wagers placed in the gaming system, determined based on the status of one or more players (such as determined through a player tracking system), determined based on time, or determined based on any other suitable method. In this embodiment, after the accumulated value progressive award causes a bonus event triggering condition to occur, the accumulated value progressive award is reset to a default value and starts incrementing from the default progressive award level.

In different embodiments, the range of values associated with an accumulated value progressive award is predetermined, randomly determined, determined based on the wagers placed in the gaming system, determined based on the status of one or more players (such as determined through a player tracking system), determined based on time, or determined based on any other suitable method. In one embodiment, a plurality of accumulated value progressive awards are associated with different value ranges. In another embodiment, each of a plurality of accumulated value progressive awards are associated with a different value range. In another embodiment, a plurality of accumulated value progressive awards are associated with the same value range. In another embodiment, the value range associated with an accumulated value progressive award is based on a player's status (via a player tracking system).

In another such embodiment, the bonus event triggering condition occurs based on time. In this embodiment, a time is set for when a bonus event triggering condition will occur. In one embodiment, such a set time is based on historic data. In one such embodiment, if previous bonus event triggering conditions have occurred after approximately thirty-seven minutes, a bonus event triggering condition is set to trigger thirty-seven minutes from the conclusion of the previous bonus event triggering condition. In one embodiment, a suitable algorithm is implemented to determine the player who wagered at or closest to this time with tie-breaking based on any number of factors (e.g., player tracking history, amount of or recent wagers placed).

In another such embodiment, the bonus event triggering condition occurs based on a predefined variable reaching a defined parameter threshold. For example, the bonus event triggering condition occurs when the 500th different player has played the gaming system associated with the bonus event triggering condition (ascertained from a player tracking system). In different embodiments, the predefined parameter thresholds include a length of time, a length of time after a certain dollar amount is hit, a wager level threshold for the gaming system (which gaming device is the first to contribute $250,000), a number of gaming machines in the gaming system active, or any other parameter that would define a threshold for the occurrence of the bonus event triggering condition.

In another such embodiment, the bonus event triggering condition occurs after a random number of plays in which a bonus event triggering condition has not occurred. In another alternative embodiment, the gaming system determines if a bonus event triggering condition occurs based upon gaming system operator defined player eligibility parameters stored on a player tracking system (such as via a player tracking card or other suitable manner). For example, a gaming system operator may choose to only enable players of the highest player tracking status to be eligible for a bonus event triggering condition. In this embodiment, the parameters for eligibility are defined by the gaming system operator based on any suitable criterion. In one embodiment, the central controller/gaming device processor recognizes the player's identification (via the player tracking system) when the player inserts their player tracking card in the gaming machine. The central server/gaming device processor determines the player tracking level of the player and if the current player tracking level defined by the gaming system operator is eligible for the bonus event triggering condition. In one embodiment, the gaming system operator defines minimum bet levels required for the bonus event triggering condition based on the player's card level. In this embodiment, different bet amounts are required to be eligible for different bonus event triggering conditions. In another embodiment, as described above, different side bets or side-wager amounts are required to be eligible for different bonus event triggering conditions. Once the central controller/gaming device processor determines which players are eligible, any suitable method for determining if a bonus event triggering condition occurs may be employed.

In another such embodiment, the occurrence of the bonus event triggering condition includes a system determination which is based on a random selection by the central controller. In one embodiment, the central controller tracks all active gaming systems and the wagers they placed. Each gaming system has its own entry defining its state as either active or inactive and also defining the values of the wagers from that gaming system. In one embodiment, active status means that the gaming system is being actively played by a player and enrolled/inactive status means that the gaming system is not being actively played by a player. The active status requirements can be based on any suitable number of satisfied criteria or defined in any suitable manner by the implementer of the gaming system. In one embodiment, a play of or wager on the primary game of the gaming system within a predetermined period of time is part of the determination of whether that gaming system is in the active status. Other factors such as: (a) the amount of time between each play of or wager on the primary game of the gaming system; (b) the amount being wagered on the primary game(s); and (c) the number of plays within a period of time, may also or alternatively be part of the determination of whether a gaming system is in the active status; (d) the existence of credits on the gaming system may also or alternatively be part of the determination of whether a gaming system is in the active status.

In one such embodiment, based on the gaming machine's state as well as one or more wager pools associated with the gaming machine, the central controller determines if a bonus event triggering condition occurs for one or more gaming devices. In one embodiment, a bonus event triggering condition occurs for the gaming machine which has been classified as active the longest since the last triggering event. In another embodiment, a bonus event triggering condition occurs based on the relative proportion of gaming/wagering activity at each gaming device in the gaming system. In this embodiment, a bonus event triggering condition is more likely to occur for the player who consistently places a higher wager than a player who consistently places a minimum wager.

In another embodiment, the central controller determines, in cooperation with the gaming system, when to cause a bonus event triggering condition to occur by utilizing one or more random number generators. In this embodiment, the central controller determines when to cause the bonus event triggering condition to occur by determining if any numbers allotted to a gaming system match a randomly selected number. In one such embodiment, upon or prior to each play of the game, a random number is selected from a range of numbers and during each primary game, the gaming system allocates the first N numbers in the range, where N is the number of credits bet by the player in that primary game. At the end of the primary game, the randomly selected number is compared with the numbers allocated to the player and if a match occurs, the gaming system causes a bonus event triggering condition to occur. It should be appreciated that any suitable manner of causing the bonus event triggering condition to occur may be implemented with the gaming system disclosed herein.

In one embodiment, the central controller and an individual gaming machine work in conjunction with each other to determine when a bonus event triggering condition occurs, for example through an individual gaming machine meeting a predetermined requirement or criteria established by the central controller. In another embodiment, an individual gaming machine may determine when one or more bonus event triggering conditions occur. In another embodiment, an individual gaming machine may determine when at least one bonus event triggering condition occurs and the central controller determines when at least one bonus event triggering condition occurs. In different embodiment, the determination of if a bonus event triggering condition occurs is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria. It should be appreciated that any suitable determination of how and when one or more bonus event triggering conditions occur may be implemented in accordance with the gaming system disclosed herein.

In another embodiment, the gaming system generates a plurality of random numbers for each bonus event eligibility point accumulated by each player. In this embodiment, as described above, the gaming system determines which one of the accumulated bonus event eligibility points is the designated bonus event eligibility point by determining which one of the randomly generated numbers is the designated or winning random number. For example, for each bonus event eligibility point accumulated by a player, the gaming system randomly generates two numbers. In another embodiment, the gaming system generates one random number for each of a plurality of bonus event eligibility points accumulated by each player. In this embodiment, as described above, the gaming system determines which one of the accumulated bonus event eligibility points is the designated bonus event eligibility point by determining which one of the randomly generated numbers is the designated or winning random number. For example, for each two bonus event eligibility points accumulated by a player, the gaming system randomly generates one number. In different embodiments, the quantity of random numbers generated for each bonus event eligibility points accumulated by each player is predetermined, randomly determined, determined based on a generated symbol or symbol combination, determined based on a random determination by the central controller, determined based on a random determination by one or more gaming devices, determined based on the status of one or more players (such as determined through a player tracking system), determined based on one or more side wagers placed, determined based on a player's primary game wager, determined based on time (such as the time of day), determined based on the amount of coin-in accumulated in one or more pools, or determined based on any other suitable method or criteria.

As described above, in one embodiment, when a plurality of randomly generated numbers are each determined to be the designated or winning random number (e.g., when one or more players tie for the highest randomly generated number), the tie is resolved by redrawing numbers for the bonus event eligibility points which resulted in the tie. In this embodiment, the highest number from that redraw is determined to be the winner and if there is a further tie, redrawing will continue until there is no tie. In one such embodiment, each bonus event eligibility point is considered independent of which player accumulated that bonus event eligibility point. For example, if there are 10 total bonus event eligibility points in play, each bonus event eligibility point should have a 1/10 chance of being the designated bonus event eligibility point (and enabling the player whom accumulated that bonus event eligibility point to participate in the bonus game). Accordingly, each player's probability of accumulating the designated bonus event eligibility point can be shown to be proportional to the number or quantity of bonus event eligibility points that player has accumulated.

For example, if two bonus event eligibility points, A and B have been accumulated and the random numbers for the accumulated bonus event eligibility points are drawn from a range of R, then:

$$\text{Total Possibilities}=R\hat{\ }2$$

The number of ways that A will win is calculated as:

$$\Sigma_{i=1}^{R-1} i=(R-1)*R/2, \text{ wherein } i \text{ is the number drawn for } A.$$

This formula represents the number of possible values for B's draw which result in A winning.

The number of ways that A and B will tie is calculated as:

$$\Sigma_{i=0}^{R-1} 1=R, \text{ wherein } i \text{ is the number drawn for } A \text{ and } B.$$

This formula represents the number of possible values which result in a tie. In this example, a tie results in the same scenario as the original (i.e., two bonus event eligibility points each drawing one number).

Accordingly, A's total probability of winning with two numbers in play is:

$$P(2)=(R-1)*R/2/R\hat{\ }2) \text{ (}A\text{ wins outright)}$$

$$+(R/R\hat{\ }2)*P(2) \text{ (}A\text{ and }B\text{ tie, }A\text{ eventually wins)}$$

$$P(2)=(R-1)/(2*R))+(1/R)*P(2)$$

$$P(2)=(R-1)/(2*R)+(1/R)*P(2)$$

$$(1-(1/R))*P(2)=(R-1)/(2*R)$$

$$((R-1)/R)*P(2)=(R-1)/(2*R)$$

$$P(2)=\tfrac{1}{2}=0.5$$

In another example, if three bonus event eligibility points, A, B and C have been accumulated and the random numbers for the accumulated bonus event eligibility points are drawn from a range of R, then:

$$\text{Total Possibilities}=R\hat{\ }3$$

The number of ways that A will win is calculated as:

$$\Sigma_{i=1}^{R-1} i\hat{\ }2=(R-1)*R*(2*R-1)/6, \text{ wherein } i \text{ is the number drawn for } A.$$

This formula represents the number of possible values for B's and C's draws which result in A winning.

The number of ways that A and B will tie is calculated as:

$$\Sigma_{i=1}^{R-1} i=(R-1)*R/2, \text{ wherein } i \text{ is the number drawn for } A \text{ and } B.$$

This formula represents the number of possible values for C's draw which are less than A's draw.

The number of ways that A and C will tie is calculated as:

$$\Sigma_{i=1}^{R-1} i=(R-1)*R/2, \text{ wherein } i \text{ is the number drawn for } A \text{ and } C.$$

This formula represents the number of possible values for B's draw which are less than A's draw.

The number of ways that A, B and C will tie is calculated as:

$$\Sigma_{i=0}^{R-1} 1=R, \ i \text{ is the number drawn for } A, B \text{ and } C.$$

This formula represents the number of possible values which result in a tie. In this example, a tie results in the same scenario as the original (i.e., three bonus event eligibility points each drawing one number).

Accordingly, A's total probability of winning with three numbers in play is:

$$P(3) = (R-1)*R*(2*R-1)/6/R^{\wedge}3 \text{ (A wins outright)} + (R-1)*R/2/R^{\wedge}3*P(2)(\text{A and B tie, A eventually wins}) + (R-1)*R/2/R^{\wedge}3*P(2)(\text{A and C tie, A eventually wins}) + R/R^{\wedge}3*P(3) \text{ (A, B and C tie, A eventually wins)}$$

$$P(3) = (R-1)*(2*R-1)/(6*R^{\wedge}2) + (R-1)/(2*R^{\wedge}2)*P(2) + (R-1)/(2*R^{\wedge}2)*P(2) + 1/R^{\wedge}2*P(3)$$

$$P(3) = (R-1)*(2*R-1)/(6*R^{\wedge}2) + (R-1)/(2*R^{\wedge}2)*0.5 + (R-1)/(2*R^{\wedge}2)*0.5 + 1/R^{\wedge}2*P(3)$$

$$P(3) = (R-1)*(2*R-1)/(6*R^{\wedge}2) + (R-1)/(2*R^{\wedge}2) + 1/R^{\wedge}2*P(3)$$

$$P(3) = (R-1)*(2*R-1)/(6*R^{\wedge}2) + 3*(R-1)/(6*R^{\wedge}2) + 1/R^{\wedge}2*P(3)$$

$$P(3) = (R-1)*(2*R+2)/(6*R^{\wedge}2) + 1/R^{\wedge}2*P(3)$$

$$P(3) = (R-1)*(R+1)/(3*R^{\wedge}2) + 1/R^{\wedge}2*P(3)$$

$$(1-1/R^{\wedge}2)*P(3) = (R-1)*(R+1)/(3*R^{\wedge}2)$$

$$((R^{\wedge}2-1)/R^{\wedge}2)*P(3) = (R-1)*(R+1)/(3*R^{\wedge}2)$$

$$((R^{\wedge}2-1)/R^{\wedge}2)*P(3) = (R-1)*(R+1)/(3*R^{\wedge}2)$$

$$((R-1)*(R+1)/R^{\wedge}2)*P(3) = (R-1)*(R+1)/(3*R^{\wedge}2)$$

$$P(3) = 1/3$$

Accordingly, to calculate the probability of a single bonus event eligibility point being designated as the winning bonus event eligibility point when T total points are in play, a spreadsheet is utilized with the range set to 10,000. Each row, R, represents the number drawn for the single bonus event eligibility point being considered, wherein that number is the highest number drawn Each column, C, represents the number of bonus event eligibility points which tied for that number. The probability of the bonus event eligibility point winning is calculated as:

$P(T,R,C)$=Probability of the bonus event eligibility point choosing number $R$

- Ways to choose C−1 other bonus event eligibility points to tie with, resulting in a C-way tie
- Probability of those C−1 other bonus event eligibility points also choosing number R
- Probability of all remaining T−C bonus even eligibility points choosing a number<R
- Probability that the tie resolution will result in the selected bonus event eligibility point winning.

$$P(T,R,C)=(1/10{,}000)$$

$$\text{Combin}(T-1,C-1)$$

$$(1/10{,}000)^{\wedge}(C-1)$$

$$(R/10{,}000)^{\wedge}(T-C)$$

$$1/C$$

In this example, the use of 1/C for tie resolution on a C-way tie assumes that it has already been proven for all values of C<T. It has been proven for C=2 and C=3. Greater values can be entered into the spreadsheet to prove their probability. The formula is calculated for all values of R from 0 to 9,999 and all values of C from 1 to T−1. The probability of tie resolution for a T-way tie is not known, so the column C=T is not filled in. Rather, it uses the formula:

$$P(T)=\text{Sum of all } P(T,R,C)+\text{Probability of a } T\text{-way tie}*P(T)$$

$$P(T)=\text{Sum of all } P(T,R,C)+(1/10{,}000)^{\wedge}(T-1)*P(T)$$

$$(1-1/10{,}000^{\wedge}(T-1))*P(T)=\text{Sum of all } P(T,R,C)$$

$$P(T)=\text{Sum of all } P(T,R,C)/(1-(1/10{,}000)^{\wedge}(T-1))$$

Accordingly, the above-described proofs illustrate that: (i) when two bonus event eligibility points compete for the highest number, each has a one in two chance of winning; and (ii) when three bonus event eligibility points compete for the highest number, each has a one in three chance of winning. Thus, for T bonus event eligibility points in play, each bonus event eligibility point has a one in T chance of winning, even after considering redraws for tie resolution.

In an alternative embodiment, the gaming system determines which player participates in the bonus event by drawing a random number from a range of one to the total number of bonus event eligibility points for all of the eligible players. The gaming system assigns each player a separate range of numbers equal to their number of accumulated bonus event eligibility points. In this embodiment, the gaming system forms a total range of numbers from the separate ranges of numbers and randomly generates a number from this total range of numbers. The gaming system determines that the player assigned to the range of numbers in which the drawn random number falls in participates in the bonus event. For example, the gaming system assigns: (i) the range of one to two-hundred to a first player with two-hundred accumulated bonus event eligibility points, (ii) the range of two-hundred-one to three-hundred to a second player with one-hundred accumulated bonus event eligibility points, and (iii) the range of three-hundred-one to four-hundred-seventy-five to a third player with one-hundred-seventy-five accumulated bonus event eligibility points. In this example, the gaming system randomly draws a number from the range of one to four-hundred-seventy-five, wherein: (i) if the randomly drawn number is between one and two-hundred, the first player participates in the bonus event, (ii) if the randomly drawn number is between two-hundred-one and three-hundred, the second player participates in the bonus event, and (iii) if the randomly drawn number is between three-hundred-one and four-hundred-seventy-five, the third player participates in the bonus event.

In another embodiment, the gaming system determines which player participates in the bonus event by drawing a random number from a set or total range of numbers. The gaming system assigns each player a separate range of numbers base on their quantity of accumulated bonus event eligibility points proportional to the total quantity of outstanding accumulated bonus event eligibility points. In this embodiment, the gaming system determines that the player assigned to the separate range of numbers in which the drawn random number falls in participates in the bonus event. For example, the gaming system determines that there are ten bonus event eligibility points outstanding and the set range of numbers is from one to ten-thousand. In this example, the gaming system assigns: (i) the range of one to five-thousand to a first player with five accumulated bonus event eligibility points, (ii) the range of five-thousand-one to eight-thousand to a second player with three accumulated bonus event eligibility points, and (iii) the range of eight-thousand-one to ten-thousand to a third player with two accumulated bonus event eligibility points. In this example, the gaming system randomly draws a number from the range of one to ten-thousand, wherein: (i) if the randomly drawn number is between one and five-thousand, the first player participates in the bonus event, (ii) if the randomly drawn number is between five-thousand-one and eight-thousand, the second player participates in the bonus event, and (iii) if the randomly drawn number is between eight-thousand-one and ten-thousand, the third player participates in the bonus event.

Information Provided to Player

As indicated above, bonus event eligibility points and/or a bonus event award may be provided to the players of the gaming machines with or without explanation or information provided to the player, or alternatively information can be displayed to the player. In one embodiment, suitable information about the bonus event eligibility points and/or bonus event awards can be provided to the players through one or more displays on the gaming machines or additional information displays positioned near the gaming machines, such as above a bank of system gaming machines. In one embodiment, a metering and/or information display device may be used to display information regarding the bonus event eligibility points and/or the bonus event awards. This information can be used to entertain the player or inform the player that a bonus event triggering condition has occurred or will occur. Examples of such information are:

(1) that a bonus event eligibility point accumulation event has occurred;

(2) that a bonus event eligibility point accumulation event will shortly be provided (i.e., the foreshadowing of the accumulation of a bonus event eligibility point);

(3) that one or more bonus event eligibility points have been provided to one or more players of the gaming devices;

(4) that a bonus event triggering condition has occurred;

(5) that a bonus event triggering condition will shortly occur (i.e., foreshadowing the providing of a bonus award);

(6) that one or more bonus event awards have been provided to one or more players of the gaming machines;

(7) which gaming machines have won the bonus event awards;

(8) the amount of the bonus event awards won;

(9) the highest bonus event award won;

(10) the lowest bonus event award won;

(11) the average bonus event award won;

(12) number of games played/total time since the last bonus event award was won;

(13) the number of bonus event awards won in a designated time period;

(14) the upper limit or range which one or more bonus event awards can increment to; and

(15) an average amount of time between each bonus event award being won.

It should be appreciated that such information can be provided to the players through any suitable audio, audio-visual or Visual devices.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one processor, at least one input device, at least one display device, and at least one memory device which stores a plurality of instructions, which when executed by the at least one processor, cause the at least one processor to operate with the at least one display device and the at least one input device to:

(a) maintain a plurality of progressive awards including a designated progressive award, (b) receive a wager amount placed on a play of a primary game, (c) for the wagered on play of the primary game:

(i) determine a primary game outcome, (ii) display the determined primary game outcome to a player, (iii) determine any primary game award associated with the determined primary game outcome, and (iv) display any determined primary game award to the player, and (d) in addition to and independent of an event of the wagered on play of the primary game:

(i) determine a quantity of at least one number, wherein said determination is based on the wager amount placed, a first wager amount is associated with a first quantity of numbers and a second, different wager amount is associated with a second, different quantity of numbers, (ii) after determining the quantity of at least one number, determine if any of the determined quantity of at least one number is a designated number, and (iii) if any of the determined quantity of at least one number is the designated number:

(A) trigger a bonus event, and (B) for the triggered bonus event:

(I) determine whether to provide the designated progressive award to the player, (II) if the determination is to provide the designated progressive award to the player, cause the designated progressive award to be provided to the player, and (III) if the determination is not to provide the designated progressive award to the player, not cause the designated progressive award to be provided to the player.

2. The gaming system of claim 1, wherein when executed by the at least one processor, the plurality of instructions cause the at least one processor to determine if any of the quantity of at least one number is the designated number by randomly determining a number from a predefined range of numbers and determining if the randomly determined number matches any of the determined quantity of at least one number.

3. The gaming system of claim 1, wherein the designated number is at least one of: a highest generated random number, a lowest generated random number, a generated random number closest to a mean number, a generated random number closest to a mode number, a generated random number closest to a median number, and a generated random number closest to a randomly generated supplemental number.

4. The gaming system of claim 1, wherein when executed by the at least one processor for the triggered bonus event, the plurality of instructions cause the at least one processor to determine whether to provide another one of the plurality of progressive awards to the player.

5. The gaming system of claim 1, wherein at least one of: the wager amount placed on the play of the primary game, at least one of the maintained progressive awards and any determined primary game award is at least one selected from the group of: a quantity of monetary credits, a quantity of non-monetary credits, a quantity of promotional credits, and a quantity of player tracking points.

6. The gaming system of claim 1, which includes a housing, and a plurality of input devices supported by the housing, said plurality of input devices including an acceptor, and a cashout device, wherein when executed by the at least one processor, the plurality of instructions cause the at least one processor to operate with the plurality of input devices to: if a physical item is received via the acceptor, establish a credit balance based, at least in part, on a monetary value associated with the received physical item, and if a cashout input is received via the cashout device, cause an initiation of any payout associated with the credit balance.

7. A gaming system server comprising:

at least one processor, and at least one memory device which stores a plurality of instructions, which when executed by the at least one processor, cause the at least one processor to:

(a) maintain a plurality of progressive awards including a designated progressive award, (b) receive data associated with a placement of a wager amount on a play of a primary game, (c) for the wagered on play of the primary game:

(i) determine a primary game outcome, (ii) cause at least one display device to display the determined primary game outcome to a player, (iii) determine any primary game award associated with the determined primary game outcome, and (iv) cause the at least one display device to display any determined primary game award to the player, and (d) in addition to and independent of an event of the wagered on play of the primary game:

(i) determine a quantity of at least one number, wherein said determination is based on the wager amount placed, a first wager amount is associated with a first quantity of numbers and a second, different wager amount is associated with a second, different quantity of numbers, (ii) after determining the quantity of at least one number, determine if any of the determined quantity of at least one number is a designated number, and (iii) if any of the determined quantity of at least one number is the designated number:

(A) trigger a bonus event, and (B) for the triggered bonus event:

(I) determine whether to provide the designated progressive award to the player, (II) if the determination is to provide the designated progressive award to the player, cause the designated progressive award to be provided to the player, and (III) if the determination is not to provide the designated progressive award to the player, not cause the designated progressive award to be provided to the player.

8. The gaming system server of claim 7, wherein when executed by the at least one processor, the plurality of instructions cause the at least one processor to determine if any of the quantity of at least one number is the designated number by randomly determining a number from a predefined range of numbers and determining if the randomly determined number matches any of the determined quantity of at least one number.

9. The gaming system server of claim 7, wherein the designated number is at least one of: a highest generated random number, a lowest generated random number, a generated random number closest to a mean number, a generated random number closest to a mode number, a generated random number closest to a median number, and a generated random number closest to a randomly generated supplemental number.

10. The gaming system server of claim 7, wherein when executed by the at least one processor for the triggered bonus event, the plurality of instructions cause the at least one processor to determine whether to provide another one of the plurality of progressive awards to the player.

11. The gaming system server of claim 7, wherein at least one of: the wager amount placed on the play of the primary game, at least one of the maintained progressive awards and any determined primary game award is at least one selected from the group of: a quantity of monetary credits, a quantity of non-monetary credits, a quantity of promotional credits, and a quantity of player tracking points.

12. The gaming system server of claim 7, which transmits and receives data over a data network.

13. The gaming system server of claim 12, wherein the data network is an internet.

14. The gaming system server of claim 7, wherein a credit balance is increasable based on any displayed primary game award, said credit balance being increasable via an acceptor of a physical item associated with a monetary value, and said credit balance being decreasable via a cashout device.

15. A method of operating a gaming system, said method comprising:

(a) causing at least one processor to maintain a plurality of progressive awards including a designated progressive award, (b) receiving a wager amount placed on a play of a primary game, (c) for the wagered on play of the primary game:

(i) causing the at least one processor to determine a primary game outcome, (ii) causing at least one display device to display the determined primary game outcome to a player, (iii) causing the at least one processor to determine any primary game award associated with the determined primary game outcome, and (iv) causing the at least one display device to display any determined primary game award to the player, and (d) in addition to and independent of an event of the wagered on play of the primary game:

(i) causing the at least one processor to determine a quantity of at least one number, wherein said determination is based on the wager amount placed, a first wager amount is associated with a first quantity of numbers and a second, different wager amount is associated with a second, different quantity of numbers, (ii) after determining the quantity of at least one number, causing the at least one processor to determine if any of the determined quantity of at least one number is a designated number, and (iii) if any of the determined quantity of at least one number is the designated number:

(A) causing the at least one processor to trigger a bonus event, and (B) for the triggered bonus event:

(I) causing the at least one processor to determine whether to provide the designated progressive award to the player, (II) if the determination is to provide the designated progressive award to the player, causing the designated progressive award to be provided to the player, and (III) if the determination is not to provide the designated progressive award to the player, not causing the designated progressive award to be provided to the player.

16. The method of claim 15, which includes causing the at least one processor to determine if any of the quantity of at least one number is the designated number by randomly determining a number from a predefined range of numbers and determining if the randomly determined number matches any of the determined quantity of at least one number.

17. The method of claim 15, wherein the designated number is at least one of: a highest generated random number, a lowest generated random number, a generated random number closest to a mean number, a generated random number closest to a mode number, a generated random number closest to a median number, and a generated random number closest to a randomly generated supplemental number.

18. The method of claim 15, which includes, for the triggered bonus event, causing the at least one processor to determine whether to provide another one of the plurality of progressive awards to the player.

19. The method of claim 15, wherein at least one of: the wager amount placed on the play of the primary game, at least one of the maintained progressive awards and any determined primary game award is at least one selected from the group of: a quantity of monetary credits, a quantity of non-monetary credits, a quantity of promotional credits, and a quantity of player tracking points.

20. The method of claim 15, which is executed through a data network.

21. The method of claim 20, wherein the data network is an internet.

22. The method of claim 15, wherein a credit balance is increasable based on any displayed primary game award, said credit balance being increasable via an acceptor of a physical item associated with a monetary value, and said credit balance being decreasable via a cashout device.

* * * * *